(12) United States Patent
Ackerman et al.

(10) Patent No.: US 10,373,008 B2
(45) Date of Patent: Aug. 6, 2019

(54) SYSTEMS AND METHODS OF BIOMETRIC ANALYSIS WITH ADAPTIVE TRIGGER

(71) Applicant: Princeton Identity, Inc., Hamilton, NJ (US)

(72) Inventors: David Alan Ackerman, Hopewell, NJ (US); James R. Bergen, Hopewell, NJ (US); Barry E. Mapen, Stonington, CT (US); Steven N. Perna, Lawrenceville, NJ (US)

(73) Assignee: Princeton Identity, Inc., Hamilton, NJ (US)

( * ) Notice: Subject to any disclaimer, the term of this patent is extended or adjusted under 35 U.S.C. 154(b) by 114 days.

(21) Appl. No.: 15/471,131

(22) Filed: Mar. 28, 2017

(65) Prior Publication Data

US 2017/0286792 A1 Oct. 5, 2017

Related U.S. Application Data

(60) Provisional application No. 62/316,347, filed on Mar. 31, 2016.

(51) Int. Cl.
*G06K 9/20* (2006.01)
*G06K 9/00* (2006.01)
(Continued)

(52) U.S. Cl.
CPC ....... *G06K 9/2027* (2013.01); *G06K 9/00228* (2013.01); *G06K 9/00604* (2013.01);
(Continued)

(58) Field of Classification Search
CPC .......... G06K 9/00228; G06K 9/00604; G06K 9/00617; G06K 9/2027; G06F 21/79; H04N 5/2256; H04N 7/183; G06T 3/0006
(Continued)

(56) References Cited

U.S. PATENT DOCUMENTS 3,852,592 A 12/1974 Scoville et al.
3,993,888 A 11/1976 Fellman
(Continued)

FOREIGN PATENT DOCUMENTS

CN 102708357 A 10/2012
CN 103048848 A 4/2013
(Continued)

OTHER PUBLICATIONS

U.S. Appl. No. 15/475,425, filed Mar. 31, 2017, Published.
(Continued)

*Primary Examiner* — Daniel G Mariam
(74) *Attorney, Agent, or Firm* — McCarter & English, LLP

(57) ABSTRACT

Exemplary embodiments are directed to biometric analysis systems including one or more illumination sources configured to provide dim illumination to a scene including an object and configured to provide flash illumination to the object in the scene. The biometric analysis systems include a rolling shutter camera configured to capture one or more images. The biometric analysis systems include an adaptive trigger module configured to analyze the scene to detect the object in the scene during dim illumination of the scene, determine a position in a frame of the rolling shutter camera that coincides with the detected object in the scene, and arrange a delay between a start of image writing by the rolling shutter camera and a trigger of the one or more illumination sources such that a stripe of the flash illumination coincides with the detected object in the scene.

24 Claims, 10 Drawing Sheets

(51) Int. Cl.
*H04N 5/225* (2006.01)
*H04N 7/18* (2006.01)

(52) U.S. Cl.
CPC ....... *G06K 9/00617* (2013.01); *H04N 5/2256* (2013.01); *H04N 7/183* (2013.01)

(58) Field of Classification Search
USPC .......................................... 382/117, 118, 124
See application file for complete search history.

(56) References Cited

U.S. PATENT DOCUMENTS

| | | | |
|---|---|---|---|
| 4,109,237 A | 8/1978 | Hill | |
| 4,641,349 A | 2/1987 | Flom et al. | |
| 5,291,560 A | 3/1994 | Daugman | |
| 5,337,104 A | 8/1994 | Smith et al. | |
| 5,481,622 A | 1/1996 | Gerhardt et al. | |
| 5,572,596 A | 11/1996 | Wildes et al. | |
| 5,835,616 A | 11/1998 | Lobo et al. | |
| 5,861,940 A | 1/1999 | Robinson et al. | |
| 5,933,515 A | 8/1999 | Pu et al. | |
| 5,953,440 A | 9/1999 | Zhang et al. | |
| 5,966,197 A | 10/1999 | Yee | |
| 5,987,459 A | 11/1999 | Swanson et al. | |
| 6,055,322 A | 4/2000 | Salganicoff et al. | |
| 6,081,607 A | 6/2000 | Mori et al. | |
| 6,119,096 A | 9/2000 | Mann et al. | |
| 6,144,754 A | 11/2000 | Okano et al. | |
| 6,204,858 B1 | 3/2001 | Gupta | |
| 6,229,907 B1 | 5/2001 | Okano et al. | |
| 6,247,813 B1 | 6/2001 | Kim et al. | |
| 6,252,976 B1 | 6/2001 | Schildkraut et al. | |
| 6,301,370 B1 | 10/2001 | Steffens et al. | |
| 6,307,954 B1 | 10/2001 | Suzaki | |
| 6,320,610 B1 | 11/2001 | Van Sant et al. | |
| 6,421,462 B1 | 7/2002 | Christian et al. | |
| 6,424,727 B1 | 7/2002 | Musgrave et al. | |
| 6,433,326 B1 | 8/2002 | Levine et al. | |
| 6,525,303 B1 | 2/2003 | Gladnick | |
| 6,526,160 B1 | 2/2003 | Ito | |
| 6,542,624 B1 | 4/2003 | Oda | |
| 6,549,644 B1 | 4/2003 | Yamamoto | |
| 6,614,919 B1 | 9/2003 | Suzaki et al. | |
| 6,714,665 B1 | 3/2004 | Hanna et al. | |
| 6,765,581 B2 | 7/2004 | Cheng | |
| 6,836,554 B1 | 12/2004 | Bolle et al. | |
| 6,850,252 B1 | 2/2005 | Hoffberg | |
| 6,895,103 B2 | 5/2005 | Chen et al. | |
| 6,912,298 B1 | 6/2005 | Wilensky | |
| 6,977,989 B2 | 12/2005 | Bothe et al. | |
| 7,015,955 B2 | 3/2006 | Funston et al. | |
| 7,095,901 B2 | 8/2006 | Lee et al. | |
| 7,099,495 B2 | 8/2006 | Kodno et al. | |
| 7,118,042 B2 | 10/2006 | Moore et al. | |
| 7,130,453 B2 | 10/2006 | Kondo et al. | |
| 7,146,027 B2 | 12/2006 | Kim et al. | |
| 7,295,686 B2 | 11/2007 | Wu | |
| 7,310,443 B1 | 12/2007 | Kris et al. | |
| 7,380,938 B2 | 6/2008 | Chmielewski, Jr. et al. | |
| 7,428,320 B2 | 9/2008 | Northcott et al. | |
| 7,466,308 B2 | 12/2008 | Dehlin | |
| 7,466,847 B2 | 12/2008 | Komura | |
| 7,542,628 B2 | 6/2009 | Lolacono et al. | |
| 7,574,021 B2 | 8/2009 | Matey | |
| 7,583,823 B2 | 9/2009 | Jones et al. | |
| 7,599,524 B2 | 10/2009 | Camus et al. | |
| 7,627,147 B2 | 12/2009 | Lolacono et al. | |
| 7,634,114 B2 | 12/2009 | Zappia | |
| 7,657,127 B2 | 2/2010 | Lolacono et al. | |
| 7,751,598 B2 | 7/2010 | Matey et al. | |
| 7,925,059 B2 | 4/2011 | Hoyos et al. | |
| 8,050,463 B2 | 11/2011 | Hamza | |
| 8,170,293 B2 | 5/2012 | Tosa et al. | |
| 8,189,879 B2 | 5/2012 | Cambier | |
| 8,195,576 B1 | 6/2012 | Grigg et al. | |
| 8,200,980 B1 | 6/2012 | Robinson et al. | |
| 8,317,325 B2 | 11/2012 | Raguin et al. | |
| 8,337,104 B2 | 12/2012 | Takiguchi et al. | |
| 8,374,404 B2 | 2/2013 | Williams et al. | |
| 8,553,948 B2 | 10/2013 | Hanna | |
| 8,603,165 B2 | 12/2013 | Park | |
| 8,639,058 B2 | 1/2014 | Bergen et al. | |
| 8,682,073 B2 | 3/2014 | Bergen | |
| 8,755,607 B2 | 6/2014 | Bergen et al. | |
| 8,854,446 B2 | 10/2014 | Bergen et al. | |
| 8,934,005 B2 | 1/2015 | De Bruijn | |
| 9,100,825 B2 | 8/2015 | Schultz et al. | |
| 9,131,141 B2 | 9/2015 | Tinker et al. | |
| 9,195,890 B2 | 11/2015 | Bergen | |
| 9,514,365 B2 | 12/2016 | Tinker et al. | |
| 9,665,772 B2 | 5/2017 | Bergen | |
| 9,836,647 B2 | 12/2017 | Perna et al. | |
| 9,836,648 B2 | 12/2017 | Perna et al. | |
| 10,025,982 B2 | 7/2018 | Perna et al. | |
| 2002/0080141 A1 | 6/2002 | Imai et al. | |
| 2002/0118864 A1 | 8/2002 | Kondo et al. | |
| 2002/0150280 A1 | 10/2002 | Li | |
| 2002/0154794 A1 | 10/2002 | Cho | |
| 2002/0164054 A1 | 11/2002 | McCartney et al. | |
| 2002/0180586 A1 | 12/2002 | Kitson et al. | |
| 2003/0046553 A1 | 3/2003 | Angelo | |
| 2003/0103652 A1 | 6/2003 | Lee et al. | |
| 2003/0123711 A1 | 7/2003 | Kim et al. | |
| 2003/0169334 A1 | 9/2003 | Braithwaite et al. | |
| 2003/0174211 A1 | 9/2003 | Imaoka et al. | |
| 2004/0037452 A1 | 2/2004 | Shin | |
| 2004/0088584 A1 | 5/2004 | Shachar et al. | |
| 2004/0146187 A1 | 7/2004 | Jeng | |
| 2004/0170304 A1 | 9/2004 | Haven | |
| 2004/0213437 A1 | 10/2004 | Howard et al. | |
| 2004/0236549 A1 | 11/2004 | Dalton | |
| 2005/0047655 A1 | 3/2005 | Luo et al. | |
| 2005/0063582 A1 | 3/2005 | Park et al. | |
| 2005/0084179 A1 | 4/2005 | Hanna et al. | |
| 2005/0088200 A1 | 4/2005 | Takekuma et al. | |
| 2005/0210267 A1 | 9/2005 | Sugano et al. | |
| 2005/0270386 A1 | 12/2005 | Saitoh et al. | |
| 2006/0008125 A1 | 1/2006 | Lauper et al. | |
| 2006/0028617 A1 | 2/2006 | Matsumura et al. | |
| 2006/0098097 A1 | 5/2006 | Wach et al. | |
| 2006/0105806 A1 | 5/2006 | Vance et al. | |
| 2006/0120570 A1 | 6/2006 | Azuma et al. | |
| 2006/0140454 A1 | 6/2006 | Northcott et al. | |
| 2006/0150928 A1 | 7/2006 | Lehmann et al. | |
| 2006/0184243 A1 | 8/2006 | Yilmaz | |
| 2006/0202036 A1* | 9/2006 | Wang | G06K 7/10722 235/462.07 |
| 2006/0210123 A1 | 9/2006 | Kondo et al. | |
| 2006/0222212 A1 | 10/2006 | Du et al. | |
| 2006/0245623 A1 | 11/2006 | Loiacono et al. | |
| 2006/0274918 A1 | 12/2006 | Amantea et al. | |
| 2007/0014439 A1 | 1/2007 | Ando | |
| 2007/0025598 A1 | 2/2007 | Kobayashi et al. | |
| 2007/0036397 A1 | 2/2007 | Hamza | |
| 2007/0047770 A1 | 3/2007 | Swope et al. | |
| 2007/0140531 A1 | 6/2007 | Hamza | |
| 2007/0160266 A1 | 7/2007 | Jones et al. | |
| 2007/0189582 A1 | 8/2007 | Hamza et al. | |
| 2007/0198850 A1 | 8/2007 | Martin et al. | |
| 2007/0201728 A1 | 8/2007 | Monro | |
| 2007/0206935 A1 | 9/2007 | Ono | |
| 2007/0236567 A1 | 10/2007 | Pillman et al. | |
| 2007/0285537 A1 | 12/2007 | Dwinell et al. | |
| 2008/0049185 A1 | 2/2008 | Huffman et al. | |
| 2008/0069411 A1* | 3/2008 | Friedman | G06K 9/00255 382/118 |
| 2008/0121721 A1 | 5/2008 | Chen et al. | |
| 2008/0180544 A1* | 7/2008 | Drader | G03B 15/05 348/223.1 |
| 2008/0187174 A1 | 8/2008 | Metaxas et al. | |
| 2008/0219515 A1 | 9/2008 | Namgoong | |
| 2008/0271116 A1 | 10/2008 | Robinson et al. | |
| 2009/0041309 A1 | 2/2009 | Kim | |
| 2009/0208064 A1 | 8/2009 | Cambier | |

(56) References Cited

U.S. PATENT DOCUMENTS

| | | | |
|---|---|---|---|
| 2009/0216606 A1 | 8/2009 | Coffman et al. | |
| 2009/0220126 A1 | 9/2009 | Claret-Tournier et al. | |
| 2009/0232418 A1 | 9/2009 | Lolacono et al. | |
| 2009/0278922 A1 | 11/2009 | Tinker et al. | |
| 2010/0026853 A1* | 2/2010 | Mokhnatyuk | H04N 5/23296 348/240.2 |
| 2010/0034529 A1 | 2/2010 | Jelinek | |
| 2010/0046808 A1 | 2/2010 | Connell et al. | |
| 2010/0063880 A1 | 3/2010 | Atsmon et al. | |
| 2010/0082398 A1 | 4/2010 | Davis et al. | |
| 2010/0142938 A1 | 6/2010 | Zhang | |
| 2010/0176802 A1 | 7/2010 | Huguet | |
| 2010/0278394 A1 | 11/2010 | Raguin et al. | |
| 2010/0287053 A1 | 11/2010 | Ganong et al. | |
| 2010/0290668 A1 | 11/2010 | Friedman et al. | |
| 2010/0301113 A1 | 12/2010 | Bohn et al. | |
| 2010/0310133 A1 | 12/2010 | Mason et al. | |
| 2010/0328420 A1 | 12/2010 | Roman | |
| 2011/0007205 A1 | 1/2011 | Lee | |
| 2011/0043683 A1 | 2/2011 | Beach et al. | |
| 2011/0075893 A1 | 3/2011 | Connel, II et al. | |
| 2011/0081946 A1 | 4/2011 | Singh | |
| 2011/0134268 A1 | 6/2011 | MacDonald | |
| 2011/0142297 A1 | 6/2011 | Yu et al. | |
| 2011/0187878 A1 | 8/2011 | Mor et al. | |
| 2011/0317991 A1* | 12/2011 | Tsai | G03B 9/70 396/180 |
| 2012/0086645 A1 | 4/2012 | Zheng et al. | |
| 2012/0154536 A1 | 6/2012 | Stoker et al. | |
| 2012/0155716 A1 | 6/2012 | Kim | |
| 2012/0163783 A1 | 6/2012 | Braithwaite et al. | |
| 2012/0243729 A1 | 9/2012 | Pasquero | |
| 2012/0293642 A1 | 11/2012 | Berini et al. | |
| 2013/0014153 A1 | 1/2013 | Bhatia et al. | |
| 2013/0044199 A1 | 2/2013 | Nanu et al. | |
| 2013/0051631 A1 | 2/2013 | Hanna | |
| 2013/0081119 A1 | 3/2013 | Sampas | |
| 2013/0083185 A1 | 4/2013 | Coleman, III | |
| 2013/0089240 A1 | 4/2013 | Northcott et al. | |
| 2013/0091520 A1 | 4/2013 | Chen | |
| 2013/0147603 A1 | 6/2013 | Malhas et al. | |
| 2013/0150120 A1 | 6/2013 | Wu et al. | |
| 2013/0162798 A1 | 6/2013 | Hanna et al. | |
| 2013/0188943 A1 | 7/2013 | Wu | |
| 2013/0194407 A1 | 8/2013 | Kim | |
| 2013/0215228 A1 | 8/2013 | Stoker et al. | |
| 2013/0250085 A1 | 9/2013 | MacKinnon | |
| 2013/0329115 A1 | 12/2013 | Palmeri | |
| 2014/0046772 A1 | 2/2014 | Raman | |
| 2014/0055337 A1 | 2/2014 | Karlsson | |
| 2014/0059607 A1 | 2/2014 | Upadhyay et al. | |
| 2014/0071547 A1 | 3/2014 | O'Neill et al. | |
| 2014/0078389 A1 | 3/2014 | Merz | |
| 2014/0161325 A1 | 6/2014 | Bergen | |
| 2014/0171150 A1 | 6/2014 | Hurst et al. | |
| 2014/0232930 A1 | 8/2014 | Anderson | |
| 2014/0327815 A1 | 11/2014 | Auger | |
| 2014/0369575 A1 | 12/2014 | Riopka et al. | |
| 2015/0037935 A1 | 2/2015 | Kim et al. | |
| 2015/0098629 A1 | 4/2015 | Perna et al. | |
| 2015/0098630 A1 | 4/2015 | Perna et al. | |
| 2015/0126245 A1 | 5/2015 | Barkan et al. | |
| 2015/0193666 A1 | 7/2015 | Derakhshani et al. | |
| 2015/0227790 A1* | 8/2015 | Smits | G06K 9/00604 348/78 |
| 2015/0286864 A1 | 10/2015 | Gottemukkula et al. | |
| 2015/0338915 A1 | 11/2015 | Publicover et al. | |
| 2015/0379325 A1 | 12/2015 | Tinker et al. | |
| 2016/0012218 A1 | 1/2016 | Perna et al. | |
| 2016/0012275 A1 | 1/2016 | Bergen | |
| 2016/0012292 A1 | 1/2016 | Perna et al. | |
| 2016/0014121 A1 | 1/2016 | Perna et al. | |
| 2016/0117544 A1 | 4/2016 | Hoyos et al. | |
| 2016/0148384 A1 | 5/2016 | Bud et al. | |
| 2016/0274660 A1 | 9/2016 | Publicover et al. | |
| 2016/0345818 A1 | 12/2016 | Suzuki et al. | |
| 2016/0364609 A1 | 12/2016 | Ivanisov et al. | |
| 2017/0111568 A1 | 4/2017 | Hsieh et al. | |
| 2017/0124314 A1 | 5/2017 | Laumea | |
| 2017/0132399 A1 | 5/2017 | Pawluk et al. | |
| 2017/0286790 A1 | 10/2017 | Mapen et al. | |
| 2017/0286792 A1 | 10/2017 | Ackerman et al. | |
| 2017/0323167 A1 | 11/2017 | Mapen et al. | |
| 2017/0337439 A1 | 11/2017 | Ackerman et al. | |
| 2017/0337440 A1 | 11/2017 | Green et al. | |
| 2017/0337441 A1 | 11/2017 | Mapen et al. | |
| 2017/0347000 A1 | 11/2017 | Perna et al. | |
| 2018/0025244 A1 | 1/2018 | Bohl et al. | |
| 2018/0165537 A1 | 6/2018 | Ackerman | |

FOREIGN PATENT DOCUMENTS

| | | |
|---|---|---|
| CN | 103099624 A | 5/2013 |
| EP | 0821912 A2 | 2/1998 |
| EP | 1324259 A1 | 7/2003 |
| JP | 2007011667 A | 1/2007 |
| JP | 2008-538425 A | 10/2008 |
| JP | 4372321 B2 | 11/2009 |
| KR | 2003-0066512 A | 8/2003 |
| KR | 10-2011-0134848 A | 12/2011 |
| WO | WO-1996/19132 A1 | 6/1996 |
| WO | WO-1997/14873 A1 | 4/1997 |
| WO | WO-1997/21188 A1 | 6/1997 |
| WO | WO-1998/08439 A1 | 3/1998 |
| WO | WO-1999/31183 A1 | 6/1999 |
| WO | WO-2000/39760 A1 | 7/2000 |
| WO | WO-2013/056001 A1 | 4/2013 |
| WO | WO-2014/093227 A1 | 6/2014 |
| WO | WO-2014/100250 A2 | 6/2014 |
| WO | WO-2015/102704 A2 | 7/2015 |
| WO | WO-2017/172695 A1 | 10/2017 |
| WO | WO-2017/173228 A1 | 10/2017 |

OTHER PUBLICATIONS

U.S. Appl. No. 15/514,098, filed Mar. 24, 2017, Published.
U.S. Appl. No. 15/531,922, filed May 31, 2017, Published.
U.S. Appl. No. 15/661,188, filed Jul. 27, 2017, Published.
U.S. Appl. No. 15/661,246, filed Jul. 27, 2017, Published.
U.S. Appl. No. 15/661,267, filed Jul. 27, 2017, Published.
U.S. Appl. No. 15/661,297, filed Jul. 27, 2017, Published.
U.S. Appl. No. 15/661,340, filed Jul. 27, 2017, Published.
U.S. Appl. No. 15/944,327, filed Apr. 3, 2018, Published.
Pending U.S. Appl. No. 16/039,442, filed Jul. 19, 2018.
U.S. Appl. No. 15/839,020, filed Dec. 12, 2017, Published.
Annapoorani et al., Accurate and Fast Iris Segmentation. International Journal of Engineering Science and Technology. 2010;2(6):1492-1499.
Arfken, G., "Mathematical Methods for Physicists," Academic Press, NY 6.sup.th Ed. (2005).
Atos Origin, "UK Passport Service, Biometrics Enrollment Trial." Atos Origin Report (May 2005).
Bertalmio et al., Navier-Stokes, Fluid Dynamics, and Image and Video Inpainting. Proceedings of the 2001 IEEE Computer Society Conferenc on Computer Vision and Pattern Recognition. CVPR 2001, 8 pages, (2001).
Betke, et al., "Preliminary Investigation of Real-time Monitoring of a Driver in City Traffic," IEEE Intelligent Vehicles Syposium, Oct. 3-5, 2000, Dearborn, MI, 563-568.
Boehnen et al., A Multi-Sample Standoff Multimodal Biometric System, Theory, Aoolications and Systems (BTAS), Sep. 23, 2012, pp. 127-134.
Bowyer et al., Image Understanding for Iris Biometrics: A Survey. Computer Vision and Image Understanding. 2008;110:281-307.
Braithwaite, Michael et al., "Application-Specific Biometric Templates," AutoID 2002 Workshop, Tarrytown, NY, pp. 1-10 (2002).
Burt, et al., "The Laplacian Pyramid as a Compact Image Code," IEEE Transactions on Communications, 31(4): 532-540, 1983.
Canadian Offic Action for Application 2,833,740 dated Jan. 15, 2018.

(56) References Cited

OTHER PUBLICATIONS

Office Action dated Oct. 30, 2018, issued in connection with U.S. Appl. No. 15/514,098 (35 pages).
Daugman John, "How Iris Recognition Works," IEEE Transactions on Circuits and Systems for Video Teohnology, vol. 14, No. 1 (Jan. 2004).
Daugman, J., "High confidence visual recognition of persons by a test of statistical independence", IEEE Transactions on Pattern Analysis and Machine Intelligence, 15 (11), pp. 1148-1161 (1993).
Daugman, J., "Recognizing Persons by Their Iris Patterns," in Biometrics: Personal Indentification in a Networked Society, A.K. Jain, et al., eds. Kluwer Academic Pub. 1999.
Daugman, John et al., "Iris recognition border-crossing system in the UAE," International Airport Review, Issue 2 (2004).
Daugman, John."How Iris Recognition Works" .Jun. 13, 2003. IEEE Transactions on Circuits and Systems for Video technology, vol. 14, No. 1.
Daugman, The Importance of Being Random: Statistical Principles of Iris Recognition. Pattern Recognition. Pre-publication version. 13 pages, Dec. 21, 2001.
DellaVecchia, et al., "Methodology and apparatus for using the human iris as a robust biometric," Ophthalmic Technologies VIII, SPIE Biomedical Optics Society, Photonics West Conference, San Jose, CA Jan. 24, 1998.
Du et al., Analysis of Partial Iris Recognition Using a 1-D Approach. Proceedings, IEEE International Conference on Acoustics, Speech, and Signal Processing. Mar. 18-23, 2005;2;961-964.
European Office Action for Application 12719332.4 dated Jan. 29, 2018.
European Search Report for Apllication 14876521.7 dated Oct. 19, 2017.
Extended European Search Report in connection with European Patent Application No. 15864635.6 dated Jun. 6, 2018 (8 pages).
Fan, et al., "An Efficient Automatic Iris Image Acquisition and Preprocessing System," Proceedings of the 2006 IEEE International Conference on Mechatronics and Automation, pp. 1779-1784 (6 pages).
Final Office Action dated Aug. 18, 2016 from U.S. Appl. No. 14/858,715, filed Sep. 18, 2015 (6 pages).
Final Office Action dated Aug. 4, 2016 from U.S. Appl. No. 14/509,366, filed Oct. 8, 2014 (24 pages).
Final Office Action dated Mar. 21, 2017 from U.S. Appl. No. 14/863,936, filed Sep. 24, 2015 (17 pages).
Final Office Action dated Mar. 22, 2017 from U.S. Appl. No. 14/863,950, filed Sep. 24, 2015 (16 pages).
Final Office Action dated Mar. 22, 2017 from U.S. Appl. No. 14/863,960, filed Sep. 24, 2015 (21 pages).
Final Office Action for U.S. Appl. No. 10/818,307, dated Jan. 21, 2009, 28 pages.
Final Office Action for U.S. Appl. No. 10/818,307, dated Jan. 30, 2008, 19 pages.
Final Office Action for U.S. Appl. No. 11/377,042, dated Nov. 14, 2008, 20 pages.
Final Office Action for U.S. Appl. No. 11/510,197, dated May 5, 2009, 16 pages.
Final Office Action for U.S. Appl. No. 12/464,369, dated Aug. 5, 2014, 22 pages.
Final Office Action for U.S. Appl. No. 12/464,369, dated Oct. 3, 2012, 27 pages.
Final Office Action for U.S. Appl. No. 12/576,644, dated Oct. 13, 2010, 11 pages.
Final Office Action for U.S. Appl. No. 14/100,615, dated Sep. 1, 2015, 22 pages.
Final Office Action for U.S. Appl. No. 14/509,356, dated Sep. 28, 2016, 20 pages.
Final Office Action for U.S. Appl. No. 14/509,366, dated Aug. 4, 2016, 29 pages.
Final Office Action for U.S. Appl. No. 14/846,090, dated Jun. 15, 2016, 17 pages.
Final Office Action for U.S. Appl. No. 14/858,715, dated Aug. 18, 2016, 29 pages.
Final Office Action for U.S. Appl. No. 14/858,715, dated Aug. 18, 2016, 6 pages.
Final Office Action for U.S. Appl. No. 14/863,936, dated Mar. 21, 2017, 17 pages.
Final Office Action for U.S. Appl. No. 14/863,950, dated Mar. 22, 2017, 16 pages.
Final Office Action for U.S. Appl. No. 14/863,960, dated Mar. 22, 2017, 21 pages.
First Japanese Office Action for Application 2015-545911 dated Feb. 26, 2018 ( with English translation).
FIT Validation Studies, http://www.pmifit.com/validation.htm, Mar. 2, 2004.
Google Scholar Search—"Rida Hadma" pp. 1 of 2.
Haro, et al., "Detecting and Tracking Eyes by Using Their Physiological Properties, Dynamics and Appearance," CVPR 2000, 163-168.
Hutchinson, et al., "Human-Computer Interaction Using Eye-Gaze Input," IEEE Transaction on Systems, Man and Cybernetics, 19(6): 1527-1534, 1989.
International Biometrics Group, "Independent Testing of Iris Recognition Technology, Final Report," Study Commissioned by the US Department of Homeland Security (May 2005).
International Preliminary Report on Patentability for Application No. PCT/US2015/051863, dated Mar. 28, 2017, 6 pages.
International Search Report and Written Opinion for Application No. PCT/US17/13110, dated May 18, 2017, 12 pages.
International Search Report and Written Opinion for Application No. PCT/US2013/073887, dated Mar. 20, 2014, 11 pages.
International Search Report and Written Opinion for Application No. PCT/US2017/025303, dated Jun. 16, 2017, 11 pages.
International Search Report and Written Opinion for PCT/US2017/24444 dated Jun. 19, 2017 pp. 1-15.
International Search Report and Written Opinion for PCT/US2018/042807, dated Sep. 27, 2018, pp. 1-19.
International Search Report and Written Opinionf for PCT/US2017/025303 dated Jun. 16, 2017.
International Search Report for Application No. PCT/US2015/051863, dated Dec. 10, 2015, 1 page.
International Search Report for Application No. PCT/US2017/065793, dated Feb. 16, 2018, 3 pages.
International Search Report for PCT/US2015061024, dated Mar. 31, 2016.
International Search Report of the International Searching Authority dated Jun. 28, 2018, issued in connection with International Application No. PCT/US2018/025895 (3 pages).
Iwai, Daisuke, Shoichiro Mihara, and Kosuke Sato. "Extended depth-of-field projector by fast focal sweep projection." IEEE transactions on visualization and computer graphics 21.4 (2015): 462-470.
Jacob, R., "The Use of Eye Movements in Human-Computer Interaction Techniques: What you Look at is What you Get," ACM Trans. Info.Sys., 9(3):152-169.
Japanese Office Action for Application No. 2015-545911, dated Feb. 20, 2018, 6 pages.
Li, Zexi, "An Iris Recognition Algorithm Based on Coarse and Fine Location," 2017 IEEE 2nd International Conference on Big Data Analysis, pp. 744-747 (4 pages).
Ma et al., "Efficient Iris Recognition by Characterizing Key Local Variations", IEEE Transactions on Image Processing, vol. 13, No. 6, Jun. 2004, 12 pages.
Ma., et al. "Iris Recognition Using Circular Symmetric Filters," Pattern Recognition, 2002, Proceedings 16th International Conference on vol. 2 IEEE, 2002 (4 pages).
Ma., et al., "Iris Recognition Based on Multichannel Gabor Filtering" ACCV2002: The 5th Asian Conference on Computer Vision, Jan. 23-25, 2002, Melbourne, Australia (5 pages).
Mansfield, Tony et al., "Biometric Product Testing Final Report," CESG Contract X92A/4009309, CESG/BWG Biometric Test Programme; Centre for Mathematics & Scientific Computing, National Physical Laboratory (2001).

(56) References Cited

OTHER PUBLICATIONS

Matey et al., Iris on the Move: Acquisition of Images for Iris Recognition in Less Constrained Environments. Proceedings of the IEEE. Nov. 2006;94(11):1936-1947.

Miyazawa et al., Iris Recognition Algorithm Based on Phase-Only Correlation, The Institute of Image Information and Television Engineers, JapanJun. 27, 2006, vol. 30, No. 33, pp. 45-48.

Monro et al., An Effective Human Iris Code with Low Complexity. IEEE International Conference on Image Processing. Sep. 14, 2005;3:277-280.

Narayanswamy, et al., "Extended Depth-of-Field Iris Recognition System for a Workstation Environment," Proc. SPIE. vol. 5779 (2005) (10 pages).

Negin, et al., "An Iris Biometric System for Public and Personal Use," IEEE Computer, pp. 70-75, Feb. 2000.

Nguyen, et al., "Quality-Driven Super-Resolution for Less Constrained Iris Recognition at a Distance and on the Move," IEEE Transactions on Information Forensics and Security 6.4 (2011) pp. 1248-1558 (11 pages).

Non-Final Office Action for U.S. Appl. No. 10/809,471, dated Mar. 19, 2007, 12 pages.

Non-Final Office Action for U.S. Appl. No. 10/818,307, dated Jul. 10, 2008, 28 pages.

Non-Final Office Action for U.S. Appl. No. 10/818,307, dated Mar. 20, 2007, 22 pages.

Non-Final Office Action for U.S. Appl. No. 11/334,968, dated Jan. 6, 2009, 28 pages.

Non-Final Office Action for U.S. Appl. No. 11/377,042, dated Apr. 8, 2009, 22 pages.

Non-Final Office Action for U.S. Appl. No. 11/377,042, dated Jan. 7, 2008, 13 pages.

Non-Final Office Action for U.S. Appl. No. 11/510,197, dated Oct. 10, 2008, 36 pages.

Non-Final Office Action for U.S. Appl. No. 11/510,197, dated Oct. 8, 2009, 21 pages.

Non-Final Office Action for U.S. Appl. No. 11/849,969, dated Dec. 19, 2008, 17 pages.

Non-Final Office Action for U.S. Appl. No. 11/857,432, dated Dec. 30, 2008, 23 pages.

Non-Final Office Action for U.S. Appl. No. 12/429,695, dated Sep. 2, 2009, 11 pages.

Non-Final Office Action for U.S. Appl. No. 12/464,369, dated Jan. 2, 2015, 23 pages.

Non-Final Office Action for U.S. Appl. No. 12/464,369, dated May 9, 2012, 33 pages.

Non-Final Office Action for U.S. Appl. No. 12/576,644, dated Jul. 14, 2010, 14 pages.

Non-Final Office Action for U.S. Appl. No. 13/096,716, dated May 23, 2013, 16 pages.

Non-Final Office Action for U.S. Appl. No. 13/096,724, dated Jan. 16, 2014, 29 pages.

Non-Final Office Action for U.S. Appl. No. 13/096,728, dated May 7, 2013, 33 pages.

Non-Final Office Action for U.S. Appl. No. 13/096,728, dated Nov. 8, 2012, 37 pages.

Non-Final Office Action for U.S. Appl. No. 14/100,615, dated Mar. 4, 2015, 19 pages.

Non-Final Office Action for U.S. Appl. No. 14/509,356, dated Feb. 29, 2016, 19 pages.

Non-Final Office Action for U.S. Appl. No. 14/509,356, dated Mar. 16, 2017, 21 pages.

Non-Final Office Action for U.S. Appl. No. 14/509,366, dated Feb. 21, 2017, 25 pages.

Non-Final Office Action for U.S. Appl. No. 14/509,366, dated Mar. 3, 2016, 40 pages.

Non-Final Office Action for U.S. Appl. No. 14/846,090, dated Jan. 7, 2016, 35 pages.

Non-Final Office Action for U.S. Appl. No. 14/858,715, dated Mar. 14, 2016, 37 pages.

Non-Final Office Action for U.S. Appl. No. 14/863,936, dated Aug. 4, 2016, 16 pages.

Non-Final Office Action for U.S. Appl. No. 14/863,936, dated Sep. 26, 2017, 28 pages.

Non-Final Office Action for U.S. Appl. No. 14/863,950, dated Aug. 3, 2016, 15 pages.

Non-Final Office Action for U.S. Appl. No. 14/863,950, dated Sep. 26, 2017, 22 pages.

Non-Final Office Action for U.S. Appl. No. 14/863,960, dated Aug. 3, 2016, 21 pages.

Non-Final Office Action for U.S. Appl. No. 14/863,960, dated Sep. 28, 2017, 28 pages.

Non-Final Office Action for U.S. Appl. No. 15/475,425, dated Jul. 12, 2018, 31 pages.

Non-Final Office Action for U.S. Appl. No. 15/531,922, dated Jun. 12, 2018, 17 pages.

Non-Final Office Action for for U.S. Appl. No. 12/464,369, dated Feb. 27, 2014, 25 pages.

Notice of Allowance dated Feb. 1, 2017 from U.S. Appl. No. 14/858,715, filed Sep. 18, 2015 (8 pages).

Notice of Allowance for U.S. Appl. No. 10/809,471, dated Mar. 24, 2008, 14 pages.

Notice of Allowance for U.S. Appl. No. 10/809,471, dated Oct. 5, 2007, 11 pages.

Notice of Allowance for U.S. Appl. No. 10/818,307, dated May 18, 2009, 8 pages.

Notice of Allowance for U.S. Appl. No. 11/334,968, dated Apr. 17, 2009, 11 pages.

Notice of Allowance for U.S. Appl. No. 11/377,042, dated Sep. 8, 2009, 16 pages.

Notice of Allowance for U.S. Appl. No. 11/510,197, dated Feb. 1, 2010, 13 pages.

Notice of Allowance for U.S. Appl. No. 11/849,969, dated Aug. 20, 2009, 21 pages.

Notice of Allowance for U.S. Appl. No. 11/849,969, dated Jul. 10, 2009, 18 pages.

Notice of Allowance for U.S. Appl. No. 11/857,432, dated Jun. 17, 2009, 17 pages.

Notice of Allowance for U.S. Appl. No. 12/429,695, dated Dec. 15, 2009, 7 pages.

Notice of Allowance for U.S. Appl. No. 12/429,695, dated Nov. 17, 2009, 12 pages.

Notice of Allowance for U.S. Appl. No. 12/464,369, dated May 8, 2015, 29 pages.

Notice of Allowance for U.S. Appl. No. 12/576,644, dated Dec. 10, 2010, 14 pages.

Notice of Allowance for U.S. Appl. No. 13/096,716, dated Oct. 30, 2013, 25 pages.

Notice of Allowance for U.S. Appl. No. 13/096,724, dated Aug. 19, 2014, 17 pages.

Notice of Allowance for U.S. Appl. No. 13/096,728, dated Feb. 7, 2014, 33 pages.

Notice of Allowance for U.S. Appl. No. 13/096,735, dated Jun. 24, 2013, 24 pages.

Notice of Allowance for U.S. Appl. No. 13/096,735, dated Oct. 4, 2013, 26 pages.

Notice of Allowance for U.S. Appl. No. 14/100,615, dated Sep. 28, 2015, 22 pages.

Notice of Allowance for U.S. Appl. No. 14/509,356, dated Aug. 1, 2017, 29 pages.

Notice of Allowance for U.S. Appl. No. 14/509,366, dated Jul. 31, 2017, 59 pages.

Notice of Allowance for U.S. Appl. No. 14/846,090, dated Jul. 25, 2016, 22 pages.

Notice of Allowance for U.S. Appl. No. 14/858,715, dated Feb. 1, 2017, 42 pages.

Notice of Allowance for U.S. Appl. No. 14/858,715, dated Feb. 1, 2017, 8 pages.

Notice of Allowance for U.S. Appl. No. 14/858,715, dated Mar. 1, 2017, 13 pages.

Notice of Allowance for U.S. Appl. No. 14/863,936, dated Mar. 20, 2018, 9 pages.

(56) References Cited

OTHER PUBLICATIONS

Notice of Allowance for U.S. Appl. No. 14/863,950, dated Mar. 27, 2018, 9 pages.
Notice of Allowance for U.S. Appl. No. 14/863,960, dated Mar. 20, 2018, 9 pages.
Office Action dated Aug. 3, 2016 from U.S. Appl. No. 14/863,950, filed Sep. 24, 2015 (15 pages).
Office Action dated Aug. 3, 2016 from U.S. Appl. No. 14/863,960, filed Sep. 24, 2015 (21 pages).
Office Action dated Aug. 4, 2016 from U.S. Appl. No. 14/863,936, filed Sep. 24, 2015 (16 pages).
Office Action dated Feb. 21, 2017 from U.S. Appl. No. 14/509,366, filed Oct. 8, 2014 (25 pages).
Office Action dated Mar. 14, 2016 from U.S. Appl. No. 14/858,715, filed Sep. 18, 2015 (9 pages).
Office Action dated Mar. 3, 2016 from U.S. Appl. No. 14/509,366, filed Oct. 8, 2014 (19 pages).
Ortiz et al., An Optimal Strategy for Dilation Based Iris Image Enrollment. IEEE International Joint Conference on Biometrics. 6 pages, Sep. 29-Oct. 2, 2014.
Restriction Requirement for U.S. Appl. No. 11/510,197, dated May 16, 2008, 12 pages.
Robert J.K. Jakob, "Eye Movement Based Human Computer Interaction Techniques; Toward Non-Command Interfaces," Advances in Human-Computer Interaction, vol. 4, ed. by H.R. Hartson and D. Hix, pp. 151-190, Ablex Publishing Co., Norwood, N.J. (1993).
Robert J.K. Jakob, "Eye Tracking in Advanced Interface Design," in Virtual Environments and Advanced Interface Dseign, ed. by W. Barfield and T.A. Furness, pp. 258-288, Oxford University Press, New York (1995).
Roth, Mouthpiece Meditations, Part 3. Online Trombone Journal, www.trombone.org. 5 pages, Jul. 23, 2018.
Schovanec, Ocular Dynamics and Skeletal Systems, IEEE Control Systems Magazine. Aug. 2001;21(4):70-79.
Scoblete, The Future of the Electronic Shutter. pdn, Photo District News, retrieved online at: https://www.pdnonline.com/gear/cameras/the-future-of-the-electronic-shutter/, 6 pates, May 9, 2016.
Second Japanese Office Action for Application 2015-545911 dated Feb. 26, 2018 ( with English translation).
Singapore Search Report and Written Report for Application No. 11201704097X, dated Mar. 13, 2018, 5 pages.
SRI International, "Seeing the Future of Iris Recognition", available at www.sri.com/iom, Mar. 2014, 9 pages.
Swiniarski, Experiments on Human Recognition Using Error Backpropagation Artificial Neural Network. Neural Networks Class (CS553) of San Diego State University Computer Science Department, Apr. 2004.
Tan et al., Efficient Iris Recognition by Characterizing Key Local Variations. IEEE Transactions on Image Processing. Jun. 2004;13(6):739-750.
U.S. Appl. No. 14/100,615, "Iris Biometric Matching System", filed Dec. 9, 2013, 57 pages.
U.S. Appl. No. 14/100,615, "Iris Biometric Matching System," filed Dec. 9, 2013, 61 pages.
U.S. Appl. No. 61/888,130, filed Oct. 8, 2013, 20 pages.
Van der Wal, et al., "The Acadia Vision Processor," IEEE International Workshop on Computer Architecture for Machine Perception, pp. 31-40, Padova, Italy, Sep. 11-13, 2000.
Weisstein E. et al.; "Circle" From MathWorld—A Wolfram Web Resource. www.mathworld.wolfram.com/circle.html, pp. 1 to 8., Jul. 3, 2008.
Wildes, R., "Iris Recognition: An Emerging Biometric Technology," Proc. IEEE, 85(9):1348-1363, Sep. 1997.
Written Opinion for Application No. PCT/US2015/051863, dated Dec. 10, 2015, 5 pages.
Written Opinion for Application No. PCT/US2017/065793, dated Feb. 16, 2018, 10 pages.
Written Opinion for PCT/US2015061024, dated Mar. 21, 2016.
Written Opinion of the International Searching Authority dated Jun. 28, 2018, issued in connection with International Application No. PCT/US2018/025895 (10 pages).
www.m-w.com--definition- "ellipse" (Refer to Ellipse Illustration; also attached) pp. 1 of 2.
Yokoya, Ryunosuke, and Shree K. Nayar. "Extended depth of field catadioptric imaging using focal sweep." Proceedings of the IEEE International Conference on Computer Vision. 2015.
Zhu, et al., "Biometric Personal Identification Based on Iris Patterns," Pattern Recognition, Proceedings 15th International Conference on vol. 2 IEEE (2000) (4 pages).
International Search Report and Written Opinion for Application No. PCT/US17/24444 dated Jun. 19, 2017 (9 pages).
Daugman, John, The Importance of Being Random: Statistical Principles of Iris Recognition, The Journal of the Pattern Recognition, PR1656, 2001, pp. 1-13.
Scoblete, Greg, The Future of the Electronic Shutter, Photo District News, May 9, 2016, pp. 1-6.

\* cited by examiner

SYSTEMS AND METHODS OF BIOMETRIC ANALYSIS WITH ADAPTIVE TRIGGER

CROSS-REFERENCE TO RELATED APPLICATIONS

The present application claims the benefit of priority to U.S. Provisional Patent Application No. 62/316,347, filed Mar. 31, 2016, which is hereby incorporated by reference in its entirety.

TECHNICAL FIELD

The present disclosure relates to systems and methods of biometric analysis and, in particular, to biometric analysis systems including an adaptive trigger configured to align an object (e.g., a subject, a barcode, or the like) within a camera field-of-view to improve application of flash illumination to the desired area of the object for capture and analysis.

BACKGROUND

Security is a concern in a variety of transactions involving private information. As an example, iris recognition is a well-accepted and accurate means of biometric identification used in government and commercial systems around the world that enables secure transactions and an added layer of security beyond keys and/or passwords. Due to the increased security provided by iris recognition systems, an increase in use of such systems has occurred around the world.

Traditional cameras used in biometric identification are generally expensive. Video cameras that use complementary metal-oxide-semiconductor (CMOS) or semiconductor charge-coupled device (CCD) image sensors typically use electronic shutters to determine the time period over which the sensor measures light. A trigger signal opens the shutter for a predetermined time during which each pixel within the sensor array collects (integrates) incoming light. At the end of the exposure, the signal collected (integrated) in each pixel during the exposure remains fixed and is then systematically read out, converted to a digital signal, and processed to become an image. Pixels are then cleared and readied for the next exposure to light.

There are different types of electronic shutters used in the industry. FIG. 1 is a diagram of a traditional global shutter camera schedule of events for signal collection, including the timeline for exposure of each row of an image sensor in the global shutter camera. Global shutters simultaneously expose an entire array of pixels, e.g., N rows by M columns, during signal collection. During a single exposure event (during $t_{exp}$), light is simultaneously collected in each pixel. When the global shutter closes, the light signal within each pixel represents the image during the period of the single exposure. All pixels integrate signal over exactly the same period of time. Global shutter cameras avoid flash timing issues incurred when using rolling shutter cameras. However, global shutter cameras are expensive options for biometric analysis, thereby increasing the overall costs associated with biometric analysis systems.

Rolling shutter cameras save cost and size in their sensor design. FIG. 2 is a diagram of a traditional rolling shutter schedule of events for signal collection, including the rolling shutter timeline. Rolling shutters expose an array of pixels differently from global shutters. A rolling shutter system exposes a first row of pixels for an exposure time ($t_{exp}$) and then commences to read-out the exposed row of pixels for digitization. The read-out process occupies a unique onboard resource for a period referred to as a read-out time during which no other row can be read-out. To minimize the duration of the total exposure including the read-out process, the rolling shutter exposes the second row of pixels during a time that is equal to but delayed from the first row by a read-out time. The second row is thereby exposed to light and ready to be read-out at the moment that the read-out process for the first row is complete. The third row is exposed to light for a time interval equal in length to that of the first two rows but delayed relative to the second row by a read-out time allowing for the required time to read-out the second row. The process "rolls" down the pixel array reading row-by-row in sequence taking a total time equal to the exposure time for a single row plus the read-out time interval, times the number of rows. The time interval during which a row is exposed and therefore the events captured by that row are different for each row for a rolling shutter sensor. This is a key difference from a global shutter sensor, especially when using a short flash.

As shown in FIGS. 1 and 2, the light collection time period for each row of a sensor with a global shutter is simultaneous while the time periods of light collection for each row of a sensor equipped with a rolling shutter are not simultaneous. Rather, light collection time periods for each row of a rolling shutter are offset from one another with a delay between rows equal to the row read-out time. The different exposure techniques result in image shearing. For example, FIG. 3 shows an image in which a moving fan blade was captured by an image sensor with a global shutter with no or little distortion as compared to the same moving fan captured by an image sensor with a rolling shutter shown in FIG. 4. Image shearing is an inevitable consequence of the row-by-row time delays built into a rolling shutter sensor in which each row "sees" the scene over a slightly different and offset time interval.

The row-by-row delay in exposure of a rolling shutter also has an effect on coordinating an exposure with flash illumination. As discussed herein, a flash refers to a short, intense period of illumination of a subject during which the light applied by the flash dominates other sources of light on the scene (e.g., the area surrounding the subject). FIG. 5 shows the exposure of each row during $t_{exp}$ with the shaded region indicating the duration of time of the flash illumination occurring simultaneous during $t_{exp}$. In a global shutter, the exposure of all the pixels in a sensor can be coordinated with the application of the flash illumination to the scene. For example, if the period of the flash pulse is 1 ms, the global shutter can open simultaneously with the start of the pulse and close simultaneously with the end of the pulse 1 ms later. The flash illuminates the pixels during and only during their global exposure. Light forming the image is, by assumption, dominated by the light applied to the scene by the flash. If, for example, sunlight is present in the scene, the irradiance on the object from the flash is significantly brighter than that of the sunlight during the flash pulse when pixels are exposed by the global shutter.

Coordinating a flash pulse with a rolling shutter exposure is more complicated than with a global shutter. FIG. 6 shows the rolling shutter exposure during $t_{exp}$ for each row extending diagonally across the diagram, and the time period for flash illumination illustrated as the vertical shaded region $t_p$. After a flash delay, the flash pulse occurs between the start pulse and end pulse points of the diagram. Because the exposure period for each row is delayed from the previous row by a short read-out time interval, illumination of a full frame requires that a flash pulse provide illumination during a period when all rows are integrating light. Failure to meet this condition creates a situation in which some rows of pixels integrate light from the flash pulse while some do not, and perhaps some rows integrate light from only a portion of the flash pulse. In this case, the image is unevenly illuminated. As shown in FIG. 6, some rows are finished integrating before the flash starts and other rows do not start integrating until after the flash ends. In addition, other rows integrate a partial flash and some integrate the full flash. Thus, a subset of lines on the rolling shutter sensor receive adequate illumination, but outside of this set of lines, the other parts of the sensor remain largely dark.

One example of a short flash pulse can be considered with respect to FIG. 6, which, across the top horizontal line, four horizontal dashed lines, and bottom lines, respectively shows row numbers 0, 200, 450, 600, 850, and 1000. The flash pulse can start as row 200 of 1000 rows finishes integrating the signal and begins to read-out, indicated by the top dashed line. The flash pulse can end as row 850 of 1000 begins integrating the signal, indicated by the bottom dashed line. FIG. 6 shows that rows 450 through 599 receive the full illumination of the flash pulse, as bracketed by the middle two dashed lines. However, rows 200 to 449 and rows 600 to 849 only receive a portion of the flash illumination while rows outside of these ranges, e.g., rows 1 to 199 and 850 to 1000, receive no flash illumination. Assuming insignificant ambient light, the resulting image would show an illumination stripe surrounded by dim regions. The transition from bright to dim at the top and bottom of the stripe is due to rows that receive flash illumination over a fraction of the total pulse time. FIG. 7 shown a portion of an image acquired using a rolling shutter camera with a delayed flash pulse in which the recorded irradiance is plotted to show dark regions before and after the flash, ramp-up and ramp-down regions of partial illumination, and a plateau region of complete flash illumination. The plateau region of FIG. 7 is not flat because the flash itself was not uniform over the field-of-view. As another example, an image captured using a rolling shutter camera would include a horizontal stripe with a vertical height proportional to the duration of the flash illumination. In cases with bright ambient illumination, the un-flashed portion of the image would appear, but might be significantly dimmer if the flash illumination is brighter than the ambient illumination.

When an image of a particular object is desired with a rolling shutter camera, a trigger signal can be initiated by the sensor controller to fire the flash at a preset time relative to the start of image writing. For example, the flash can fire when the first line is written and can remain on for 50 of 1000 lines. The resultant image would be flash illuminated for the top 5% of the image and would be dark elsewhere. The same flash can be delayed until the 500$^{th}$ line of 1000 lines, resulting in an image with a stripe of illuminated content approximately halfway down the frame. With such an arrangement, the photographer would need to align the subject within the camera field-of-view such that the stripe of illumination detected by the sensor corresponds to the position of the desired object.

Traditionally, one solution to the problem of flash illuminating an image using a rolling shutter has been to use an extended period of illumination, e.g., a flash pulse that is started simultaneously with the beginning of the exposure of the first row of pixels and is not finished until the last row of pixels has been exposed. The extended period of illumination is needed to expose the entire image since image lines are written sequentially rather than all at once (as is the case with a camera including a more expensive and physically larger global shutter sensor). This technique necessitates a longer flash pulse compared to the global shutter case, and would show up in FIG. 6 as a shaded region covering all of the rows with a duration equal to the frame time. This technique would also illuminate the full frame shown in FIG. 7. Additional requirements on the flash in terms of power output, heating and reliability are needed based on the longer pulse for this technique. A longer pulse might also challenge requirements for eye-safety. For these reasons, full frame pulses with rolling shutters are considered impractical.

Thus, a need exists for improved biometric analysis systems including a rolling shutter that are capable of illuminating and capturing the desired area of an object for identification without an extended flash. These and other needs are addressed by the systems and methods of biometric analysis of the present disclosure.

SUMMARY

In accordance with embodiments of the present disclosure, an exemplary biometric analysis system is provided that includes one or more illumination sources configured to provide dim illumination to a scene including an object, and further configured to provide flash illumination to the object in the scene. In some embodiments, the dim illumination can be provided by an illumination source external and separate from the biometric analysis system, such as ambient light, sunlight, any other light source, or the like (e.g., one or more of the illumination sources can be ambient light). In some embodiments, the biometric analysis system can include a single illumination source that provides the dim illumination, with the same illumination source providing the flash illumination at the determined time period. In some embodiments, the biometric analysis system can include a first illumination source that provides the dim illumination, and a second (separate) illumination source that provides the flash illumination. In some embodiments, the first illumination source can continue to provide the dim illumination during the flash illumination from the second illumination source. In some embodiments, the first illumination source can be automatically actuated into a non-illuminating configuration during the flash illumination provided by the second illumination source, and automatically actuated into an illuminating configuration after the flash illumination is complete.

The biometric analysis system includes a rolling shutter camera configured to capture one or more images. The rolling shutter camera generally includes a frame with a field-of-view. The term "image" as used herein can include still frame images, video, combinations thereof, or the like. The biometric analysis system includes an adaptive trigger module configured to be executed by a controller or processing device. The adaptive trigger module, when executed, can be configured to analyze the scene to detect the object in the scene during dim illumination of the scene. The adaptive trigger module, when executed, can be configured to determine a position in the frame of the rolling shutter camera that coincides with the detected object in the scene. The adaptive trigger module, when executed, can be configured to arrange a delay (a time delay) between a start of image writing by the rolling shutter camera and a trigger of the one or more illumination sources such that a stripe of the flash illumination coincides with the detected object in the scene.

In some embodiments, the adaptive trigger module, when executed, can be configured to track movement of the object within a field-of-view of the rolling shutter camera. In such embodiments, the adaptive trigger module can be configured to modify the delay between the start of image writing by the rolling shutter camera and the trigger of the one or more illumination sources based on detected movement of the object within the field-of-view.

In some embodiments, the adaptive trigger module can be configured to detect a region of interest of the object and arranges the delay such that the stripe of flash illumination coincides with the detected region of interest of the object. In one embodiment, the region of interest of the object can include one or both eyes of a person.

In some embodiments, the object can be a person. In such embodiments, the adaptive trigger module includes a face finder configured to detect a face (and/or features of the face) of the person. In some embodiments, the object can be a physical item. In such embodiments, the adaptive trigger module can include an identifier finder configured to detect a unique identifier (e.g., a barcode, a quick response (QR) code, combinations thereof, or the like) associated with the physical item.

In some embodiments, the one or more illumination sources can be configured to provide the flash illumination as a synchronized pulse of flash illumination. The flash illumination provided by the one or more illumination sources is brighter than the dim illumination provided by the one or more illumination sources. In one embodiment, the one or more illumination sources can be near infrared (NIR) illumination sources. In some embodiments, the adaptive trigger module can be configured to sweep an illuminated stripe down the frame as the rolling shutter camera captures the one or more images, analyze an illuminated section of the one or more images to identify a region of interest in the illuminated section, and stop sweeping of the illuminated stripe when the region of interest is identified.

In accordance with embodiments of the present disclosure, an exemplary biometric analysis system is provided that includes one or more illumination sources configured to provide dim illumination to a scene including a subject and configured to provide flash illumination to the subject in the scene. The biometric analysis system includes a rolling shutter camera configured to capture one or more images. The biometric analysis system includes an adaptive trigger module configured to be executed by a controller or processing device. The adaptive trigger module, when executed, can be configured to analyze the scene to detect eyes of the subject in the scene during dim illumination of the scene. The adaptive trigger module, when executed, can be configured to identify the eyes of the subject as a region of interest. The adaptive trigger module, when executed, can be configured to determine a position in a frame of the rolling shutter camera that coincides with the identified region of interest. The adaptive trigger module, when executed, can be configured to arrange a flash pulse delay between a start of image writing by the rolling shutter camera and a trigger of the one or more illumination sources such that a stripe of the flash illumination coincides with the identified region of interest. In some embodiments, rather than or in addition to using dim illumination, the adaptive trigger module can be executed to search and find the region of interest by systematically sweeping an illuminated stripe down the field-of-view and stopped when a region of interest is detected. Thus, rather than using a single frame (as in dim illumination), the illuminated stripe can be a fraction in width of the full frame and is advanced across the field-of-view, thereby using multiple frames to detect the region of interest. The region of interest can be tracked by the adaptive trigger module after being detected.

The flash pulse delay can ensure that the illuminated region of interest is substantially maintained in a center of the frame of the rolling shutter camera. The biometric analysis system can include a feedback module configured to be executed by the controller or processing device. The feedback module, when executed, can be configured to analyze a captured image of the region of interest and determine if the region of interest is illuminated by the stripe of the flash illumination. The adaptive trigger module, when executed, can be configured to adjust the flash pulse delay based on the determination of the feedback module to ensure that the region of interest is illuminated by the stripe of the flash illumination.

In accordance with embodiments of the present disclosure, an exemplary method of biometric analysis is provided. The method includes illuminating a scene and an object in the scene with dim illumination from one or more illumination sources. The method includes analyzing the scene with an adaptive trigger module to detect the object in scene during dim illumination. The method includes determining a position in a frame of a rolling shutter camera that coincides with the detected object in the scene. The method includes arranging a delay between a start of image writing by the rolling shutter camera and a trigger of the one or more illumination sources such that a stripe of flash illumination provided by the one or more illumination sources coincides with the detected object in the scene.

In some embodiments, the method can include tracking movement of the object within a field-of-view of the rolling shutter camera with the adaptive trigger module. In such embodiments, the method can include modifying the delay between the start of image writing by the rolling shutter camera and the trigger of the one or more illumination sources with the adaptive trigger module based on detected movement of the object within the field-of-view.

In accordance with embodiments of the present disclosure, an exemplary non-transitory computer-readable medium storing instructions for biometric analysis is provided. Execution of the instructions by a processing device (or controller) causes the processing device to illuminate a scene and an object in the scene with dim illumination from one or more illumination sources. Execution of the instructions by a processing device causes the processing device to analyze the scene with an adaptive trigger module to detect the object in scene during dim illumination. Execution of the instructions by a processing device causes the processing device to determine a position in a frame of a rolling shutter camera that coincides with the detected object in the scene. Execution of the instructions by a processing device causes the processing device to arrange a delay between a start of image writing by the rolling shutter camera and a trigger of the one or more illumination sources such that a stripe of flash illumination provided by the one or more illumination sources coincides with the detected object in the scene.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems and methods of biometric analysis, reference is made to the accompanying figures, wherein.

DESCRIPTION OF EXEMPLARY EMBODIMENTS

Figure 1:
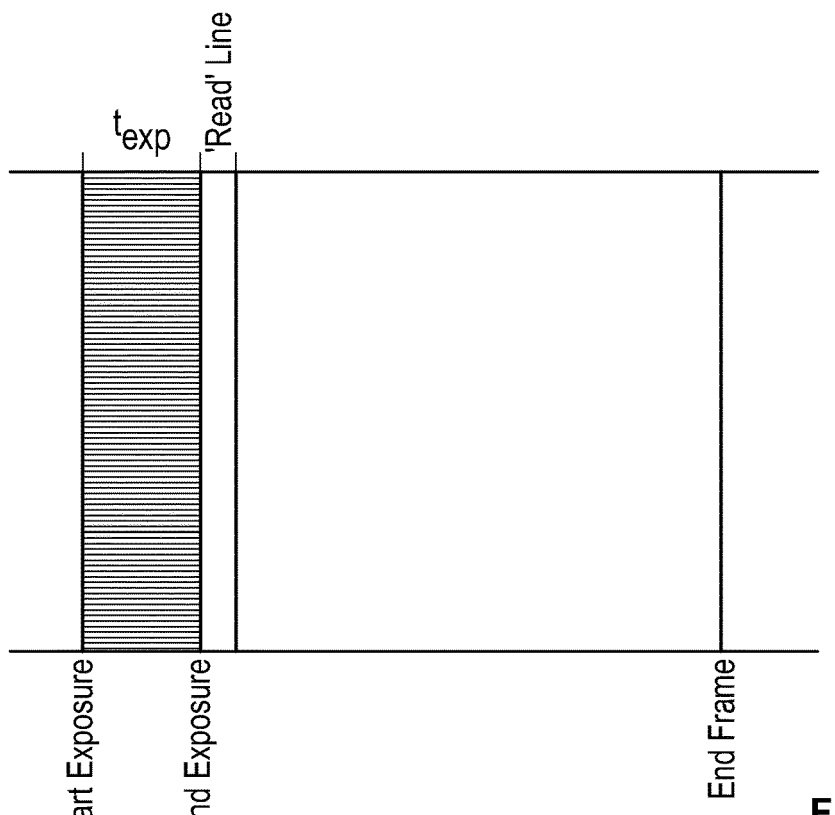
FIG. 1 (prior art) is a diagram of a traditional global shutter camera schedule of events showing simultaneous exposure of each row between start and end of exposure followed by simultaneous read-out.
Figure 2:
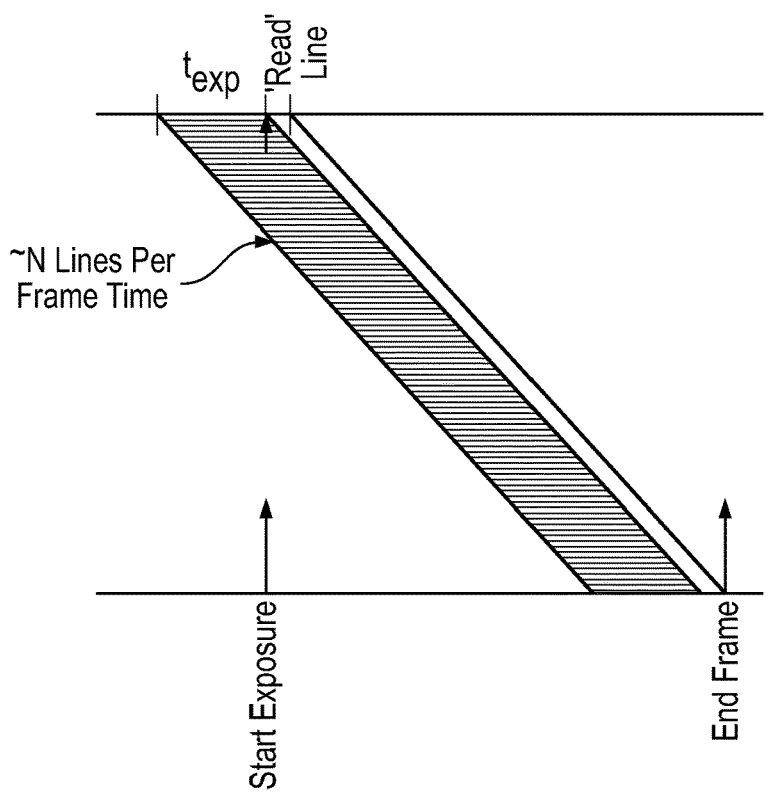
FIG. 2 (prior art) is a diagram of a traditional rolling shutter camera schedule of events showing start of frame, cascading exposure of pixel rows, and rolling read-out, with delay between rows being equal to read-out time.
Figure 3:
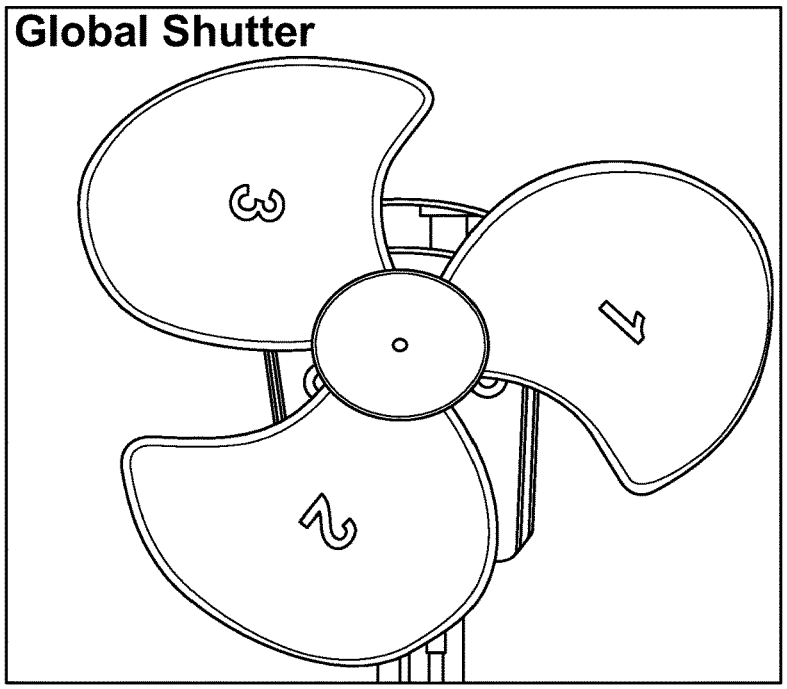
FIG. 3 (prior art) is an image of a moving fan illustrating minimal distortion as captured by a traditional global shutter camera.
Figure 4:
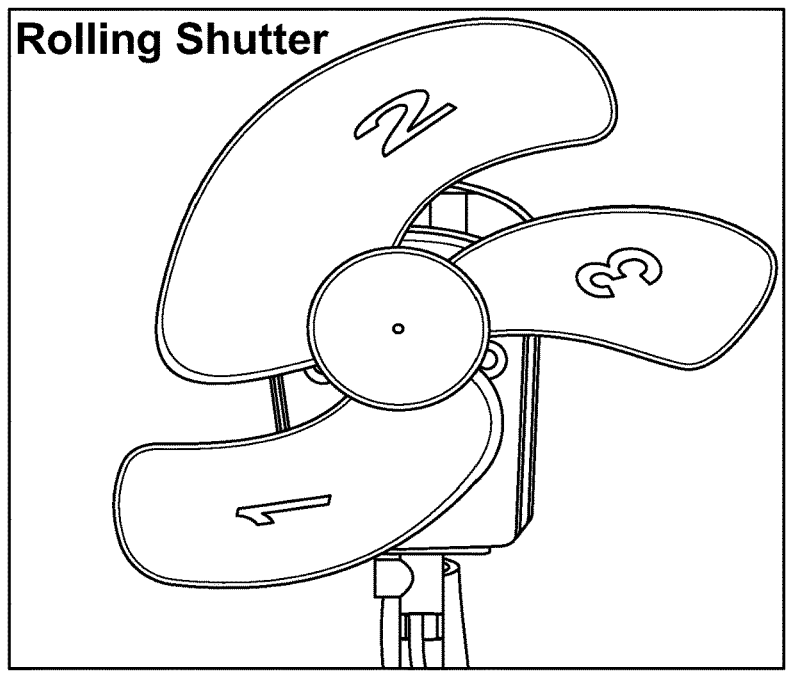
FIG. 4 (prior art) is an image of a moving fan illustrating shearing distortion effects caused by cascading row delays as captured by a traditional rolling shutter camera.
Figure 5:
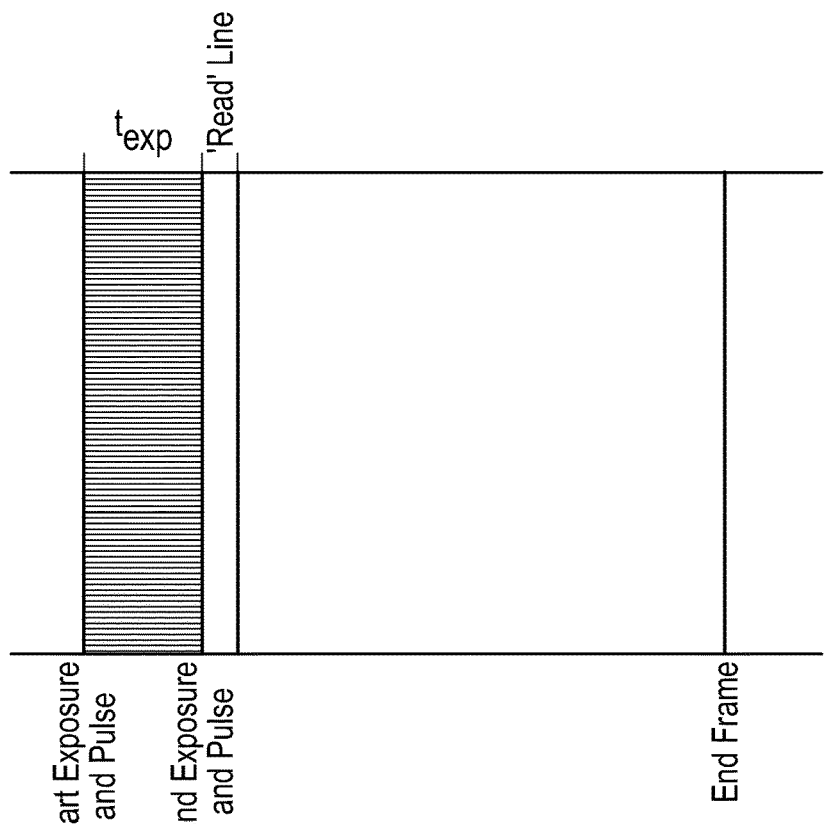
FIG. 5 (prior art) is a diagram of a traditional global shutter schedule of events showing simultaneous exposure of each row between start and end of exposure followed by simultaneous read-out, with a flash firing during the same time interval as that in which the rows are exposed ($t_{exp}$).
Figure 6:
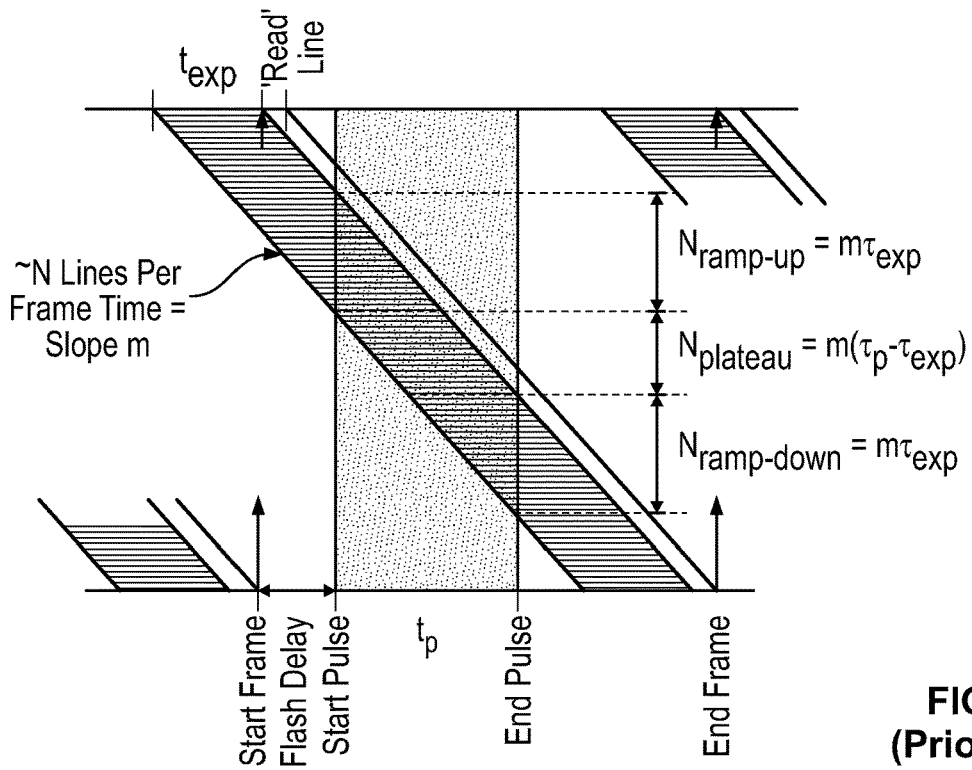
FIG. 6 (prior art) is a diagram of a traditional rolling shutter schedule of events showing start of frame, cascading exposure of pixel rows, and rolling read-out, with a flash firing after the beginning of the frame, illuminating some but not all rows, and some rows partially but others completely, resulting in a ramp-up, plateau and ramp-down periods of flash illumination.
Figure 7:
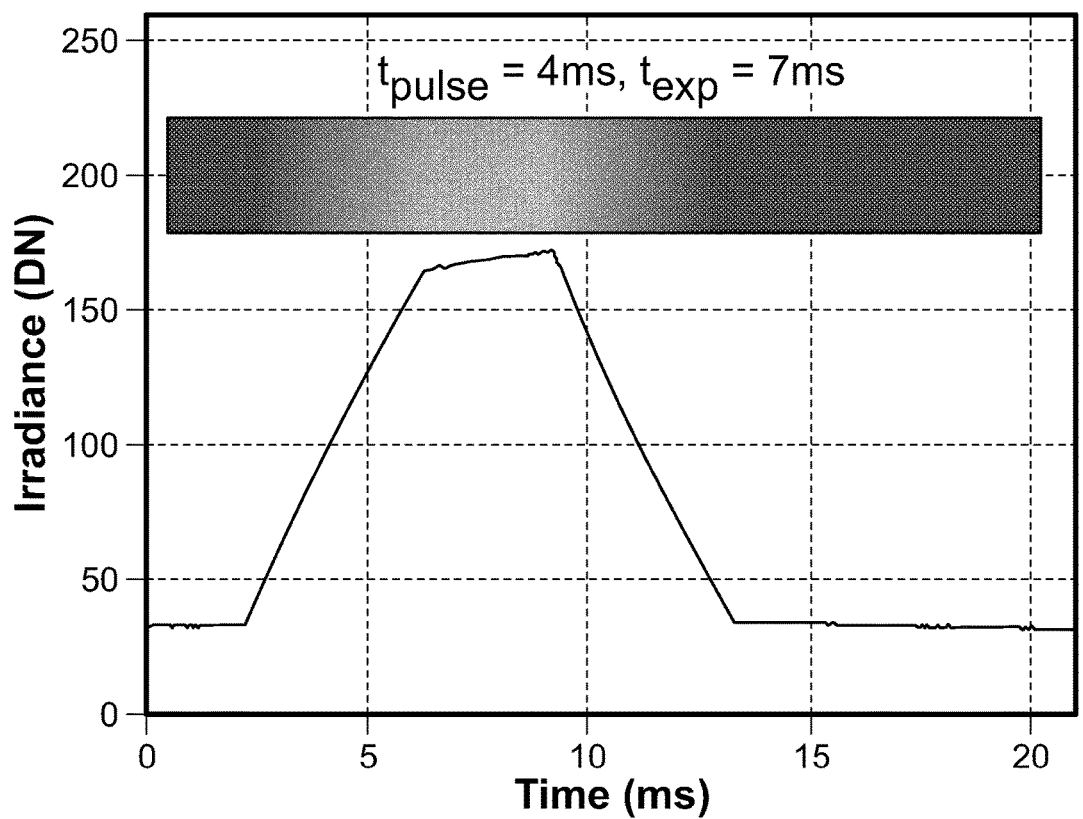
FIG. 7 (prior art) is a diagram of a vertical strip of an image (re-oriented horizontally to align with the time axis) showing dark, ramp-up, plateau, ramp-down, and another dark region due to timing of flash in a traditional rolling shutter frame.

In accordance with embodiments of the present disclosure, exemplary biometric analysis systems are described herein for a rolling shutter camera that include an adaptive trigger for ensuring that the stripe of light from the flash illumination illuminates a region of interest of an object, such as the eyes of a person, during image writing. The biometric analysis systems generally include one or more illumination sources that initially provide dim illumination to a scene to detect the object and identify the region of interest of the object. Based on the identified region of interest, a delay between the start of image writing by the rolling shutter camera and the trigger of the illumination source is arranged or coordinated to ensure that the stripe of the flash illumination coincides with the region of interest of the object.

Cameras that include rolling shutter image sensors are typically cheaper than those with global shutter image sensors. The exemplary biometric analysis systems use flash illumination in combination with inexpensive rolling shutter cameras of the type found in low-cost cameras and smartphones. The biometric analysis systems address a rolling shutter-specific problem that occurs when the brightness of the ambient light in the scene may need an exposure time less than the full frame time to avoid saturation, and the exposure time is sufficiently short that the first rows of the image are finished integrating light and reading out before the last lines of the image have begun integration. In cases of short exposure times, a single, short flash pulse will not illuminate an entire frame, leaving portions of the frame relatively dark. Long exposure times can result in motion blur.

The exemplary biometric analysis systems balance the following parameters to ensure the captured image quality is sufficient for identification, and further ensuring that the region of interest is adequately illuminated by the flash: sensor frame rate, sensor exposure time, flash pulse intensity, flash pulse duration, flash pulse repetition, processed frame rate, and flash pulse offset. Increasing the sensor frame rate over the available ranges increases the speed that the reset and read lines move over the image. For a given sensor exposure time, increasing the frame rate effectively increases the number of exposed lines during that period. For example, with the exposure time remaining the same, the execution time of the internal clock of the camera can be increased to operate the camera at a faster rate, thereby capturing a greater number of lines during the exposure time. The drawbacks of increased sensor frame rates are additional data transfers and additional heating due to higher clock speed. Lower frame rates may be desirable for dark indoor lighting conditions and higher frame rates may be desirable for outdoor bright lighting conditions.

Increasing the sensor exposure time increases the distance between the reset and read times. This effectively increases the number of exposed lines during that period, allowing a short flash pulse to cover more lines. The drawback of increasing this period is that additional ambient light is accumulated over the entire period. During outdoor operation, it may be beneficial to keep the exposure time as short as possible, but allowing enough lines to be covered by the flash. Keeping the exposure time shorter is also important to avoid introducing motion blur which can degrade recognition performance.

The flash pulse needs to be bright enough to overpower direct sunlight for effective outdoor operation. The flash pulse is limited by available system power and eye safety limits. In general, eye safety can be roughly proportional to the total amount of energy absorbed by the eye over a period of time (e.g., $t^{-0.75}$). Reducing the intensity, pulse duration, and pulse repetition all move the system into a safer standing. Longer flash pulses allow more lines to be exposed in a rolling shutter. However, longer pulses can lead to increased eye safety concerns forcing the system to use less intense pulses when longer durations are used.

Several short flash pulses may be used back-to-back to illuminate additional lines with minimal overlap between exposed lines. This technique can reduce the total eye exposure and power requirements while expanding the total number of lines that can be properly illuminated. Pulse rate, duration, and intensity can all impact the system power requirements. Increasing any of these parameters generally increases the demand for power.

In some embodiments, since eye safety depends on the total exposure over a period of time, one method to reduce the total exposure can be to selectively process frames. While images can be captured at 60 frames per second (fps), only one in four can be illuminated with the flash, which would reduce the exposure to an equivalent of 15 fps with the advantages of capturing at 60 fps. Such technique allows for improved line read speeds, bringing the rolling shutter camera closer to the global shutter camera timing.

In some embodiments, the systems can include a continuous feedback loop to a user who is attempting to align their eye with a small box on the screen (e.g., in situations involving a smaller screen, such as a smartphone). The feedback loop allows the system to predetermine which lines should be exposed. A low level of continuous, dim illumination can be provided to ensure the user has a reasonable image to complete this task. Depending on the available processing power and flash offset controls, the continuously illuminated frames can be processed to detect specular reflections, and further used to change the flash offset or delay. Such operation allows the user additional margin when attempting to place their eye in the box while keeping the exposure levels to a minimum.

The biometric analysis systems adjust the portion of the frame that is illuminated such that the important portion of the image (e.g., a region of interest) is well-lit and the unimportant portions of the images are left dim. The biometric analysis systems can be used in imaging in the near infrared (NIR) spectrum using a short, intense, eye-safe NIR flash with an NIR filter to freeze motion and emphasize the flash relative to ambient light (including bright sun). The biometric analysis systems including the NIR flash with a rolling shutter camera can be used in, e.g., iris biometrics, or the like, in which cost reduction realized by using a rolling shutter instead of a global shutter is a primary driver in component selection.

The biometric analysis systems include an adaptive step in which dim illumination allows a vision system (e.g., a sensor in a rolling shutter camera including a processor) to detect the position of the desired object in the field-of-view of the camera. In some embodiments, the dim illumination remains on for the entire process of capturing an image, and reveals an under-illuminated frame. Dim illumination, although dimmer than illumination by the flash, is bright enough to perform an automated scene analysis, e.g., face finding, object identification, or the like, that can output a recommendation of a position in the frame that would benefit from flash illumination. For example, if a face appeared between 20% and 40% of the frame height measured from the bottom, a controller or processor can arrange a delay between the start of image writing and the flash trigger such that a stripe of illumination coincides with the desired object. If the object moves in the field-of-view, biometric analysis systems can function dynamically to track movement of the object and change the delay accordingly. In some embodiments, rather than or in addition to using dim illumination, the adaptive trigger module can be executed to search and find the region of interest by systematically sweeping an illuminated stripe down the field-of-view and stopped when a region of interest is detected. Thus, rather than using a single frame (as in dim illumination), the illuminated stripe can be a fraction in width of the full frame and is advanced across the field-of-view, thereby using multiple frames to detect the region of interest. The region of interest can be tracked by the adaptive trigger module after being detected. Such arrangements to locate and track the object and indicate to the adaptive trigger module changes in the position of the object permits moving objects to be accurately imaged by the biometric analysis systems.

The biometric analysis systems disclosed herein can be used for rolling shutter photography (e.g., NIR photography) of objects while outdoors or indoors. The biometric analysis systems can acquire NIR images with controlled illumination in full sun or in dim ambient lighting. An image of a desired object that fills less than a full frame, e.g., a person's face with the entire person in the field-of-view, can be captured by the biometric analysis systems. Due to the low cost, small size and availability of rolling shutter sensors, incorporation of the biometric analysis systems into cost-sensitive or size-sensitive platforms can benefit cost-sensitive or size-sensitive users. As one example, the biometric analysis systems can be used in cargo identification in which infrared dye for markings signify authenticity. As another example, a box marked with writing can be imaged with a small and inexpensive handheld infrared camera that would look for the marking surrounding an NIR watermark.

The flash trigger can be adjusted to fire in order to illuminate the markings, leaving the rest of the field-of-view above and below the mark of interest in the dark. Handheld devices, including smartphones, barcode readers, and other mass produced electronic devices, can incorporate the biometric analysis systems at a small and low cost. Traditionally, a rolling shutter camera would reduce the cost for such systems, but would require an extended flash to illuminate an entire scene to guarantee capturing the subject of interest. The exemplary biometric analysis systems include a rolling shutter camera with an adaptive image content-based trigger that issues a shorter flash of a near infrared light that allows for use of smaller batteries, provides for a longer battery life, provides for improved eye safety, and allows for longer illumination source lifetimes.

The biometric analysis systems disclosed herein can provide flash illumination for illuminating an object sufficiently to outshine the sun, and in some embodiments can use strobing flash illumination as is disclosed in, e.g., U.S. Pat. No. 7,542,628; 7,627,147; 7,657,127; 9,131,141; U.S. Patent Application Publication No. 2015/0098630; U.S. Patent Application Publication No. 2016/0014121; U.S. Patent Application Publication No. 2016/0012218; and U.S. Patent Application Publication No. 2016/0012292, which are incorporated by reference herein.

The exemplary biometric analysis systems use a rolling shutter camera and a flash illumination that is triggered adaptively to illuminate the region of interest of the scene or object. The adaptive trigger can be configured to follow or track the subject, and adjusts the flash timing to maintain the stripe of flash illumination on the subject of interest. In one embodiment, a face finder can be used as an image analytic to trigger the flash. In one embodiment, a unique identifier, such as a bar code or QR code, can be detected and illuminated by the stripe of flash illumination. In either case, the biometric analysis system can locate the object in a relatively dimly lit scene, and then initiates the repetitive flash that illuminates the object. Flash timing can be adjusted to maintain the object in the illuminated region of the field-of-view of the rolling shutter camera.

With respect to the delayed flash, an assumption can be made that the start of integration of the first row of a rolling shutter sensor coincides with time t=0. A further assumption can be made that a flash pulse is started at some time later, e.g., delayed by a time Δt. Rows that are read-out (e.g., integrate light) before Δt miss any light from the flash. Rows that are in the process of integrating light when the flash starts—some nearly finished, some just starting—receive fractions of the flash and form the ramp-up region of partial illumination. Pixels in rows that start integrating at or after the start of the flash and that finish integrating light by the end of the flash are illuminated by the full flash. By adjusting the delay time Δt, the rows of full flash illumination can be adjusted from the top of the image frame to the bottom to focus on a region of interest located within the frame.

In particular, the biometric analysis systems can be used to detect the region of interest within the frame of the rolling shutter camera, and intentionally delay the flash illumination in a coordinated manner to ensure that the region of interest is illuminated by the flash during exposure and read-out of the corresponding rows. Proper adjustment of the delay time can cause the stripe of flash illumination due to the short flash pulse to brighten the region of interest. In some embodiments, the stripe can scan or search the image in successive frames of a photo or video stream. Such technique can be performed by systematically sweeping an illuminated stripe down the field-of-view and stopping when a region of interest is detected. Thus, rather than using a single frame (as in dim illumination), the illuminated stripe can be a fraction in width of the full frame and is advanced across the field-of-view, thereby using multiple frames to detect the region of interest. The region of interest can be tracked by the adaptive trigger module after being detected.

In some embodiments, a pre-flash (e.g., a single long, low intensity flash that illuminates the full frame and that is both eye-safe and within the operating range of the illumination hardware) can provide a single, dim image of the scene. Automated image analysis of the full scene that can tolerate the low light can detect and output a region of interest that is the width of the image and the height of the flash illumination stripe. With the region of interest defined, an automated delay signal can set the illumination stripe to the optimal position to illuminate the region of interest in succeeding frames of a photo or video stream using the full flash brightness over the narrowed region of interest. If the desired feature of the object begins to move out of the illumination stripe (as determined by video analysis performed at the frame rate), the delay can adapt using negative feedback to maintain the position of the desired feature centered within the well-lit region of the image.

In some embodiments, the biometric analysis systems can be used to capture NIR images of an object that is bathed in sunlight. While a fraction of the solar spectrum covers the NIR wavelengths, it can be assumed that filtered solar NIR irradiance (e.g., from 800 nm to 900 nm) is insufficient to illuminate a video frame that is adequately short in duration to suppress motion blur. It can be further assumed that using a long flash that covers the entire rolling shutter frame period is impractical, even with a short exposure time, due to hardware limitations or eye safety concerns. A short NIR flash pulse that can only illuminate a portion of the frame with an adaptive delay time to ensure that the region of interest is illuminated can therefore be used.

The biometric analysis systems initially detect and identify a region of interest of an object, such as the eyes of a subject. Eye finding can be accomplished using a number of different processes, such as full frame NIR illumination with a relatively dim, eye-safe (and hardware-safe) long NIR flash pulse; partial frame illumination due to a short, intense pulse that is automatically swept frame-by-frame over the full field-of-view until the eyes appear in the search; and/or image acquisition by a color (or other spectrum) auxiliary camera that produces a full frame image allowing eye-finding or face-finding, and then translation from the auxiliary camera frame position to a NIR camera position.

After the eyes are detected and their position located in the NIR camera frame, the biometric analysis systems automatically set the flash pulse delay to illuminate a stripe across the frame including the eyes (e.g., the region of interest). The delay that sets the vertical position of the illumination stripe can be automatically adjusted to maintain the eyes in substantially the center of the frame. While the portions of the frame outside of the illumination stripe remain unusably dark, the important information about the eyes remains well lit.

The competing solar illumination may dimly illuminate the rest of the frame. This is not an issue as long as the flash illumination stripe remains resolved and does not saturate due to the sum of the in-band solar irradiance and the applied NIR light. If the illumination stripe nears the saturation level, the intensity of the applied flash can be throttled back. It is preferable to decrease the NIR illumination irradiance on the object rather than reducing the exposure or pulse duration, since the later strategies reduce the portions of the image that are illuminated.

Any spectrum of light can be used as long as the camera uses a rolling shutter with an in-band flash illuminator. For example, visible light, NIR, short-wave infrared (SWIR), long-wave infrared (LWIR), ultraviolet (UV), or multi-spectral cameras with rolling shutters that use flash illumination. Any process of finding the region of interest can be used as long as the process returns a coordinate to the biometric analysis system that indicates the time delay between the start of frame and the start of the flash. For example, use of an eye finder that seeks corneal reflections of the flash could be useful if the region of interest contains one or two eyes of the subject. As a further example, a color face camera could be useful to find the eyes of a subject in iris recognition; but if nose-recognition were used, the region of interest would contain the subject's nose. If the same camera were used to find the region of interest and to acquire the information from the region of interest, a different illumination protocol could be used for each function. For example, a long, relatively dim pulse could illuminate the entire frame, followed by a short, bright pulse to illuminate the region of interest with better fidelity (e.g., improved signal-to-noise ratio). Any process that provides the information needed to set the delay time would also be useful.

In some embodiments, feedback can be used to maintain the region of interest in the illumination stripe. For example, negative feedback can be used to correct the position of the region of interest within the illumination stripe. If the object of interest begins to move or slip to the top or bottom of the region of interest illuminated by the flash, feedback can be used to correct the delay time. For example, if the stripe illuminating the region of interest needs to move up in the frame to follow the object of interest, the delay would need to be corrected in one direction. If the object of interest moves down in the frame, the sign of the delay correction would need to be in the opposite direction. If the delay reaches the minimum or maximum value or, in other words, the object of interest begins to leave the camera field-of-view, the controller or processing device automatically reorients the camera to maintain the object in the field-of-view. In some embodiments, a feedback signal (e.g., an audio alarm, a visual alarm, combinations thereof, or the like) can provide feedback to an operator regarding the object leaving the field-of-view.

The width of the flash illumination stripe relative to the frame height can be set by practical considerations. For example, rolling shutter cameras with very short read-out times generally have wider flash illumination stripes, all other things being equal. The longest flash pulse can be dictated by practical issues, including available power to the illumination source, operating conditions in power, and temperature of the illumination source. For example, it is known that flashing an illumination source too often can damage it, and reduces the safety of human eyes in and around the illumination source. A flash illumination stripe that is narrow relative to the frame height generally should be more accurately timed than a flash illumination stripe that is wider and that can tolerate more motion of the object of interest within the flash illumination stripe.

Figure 8:
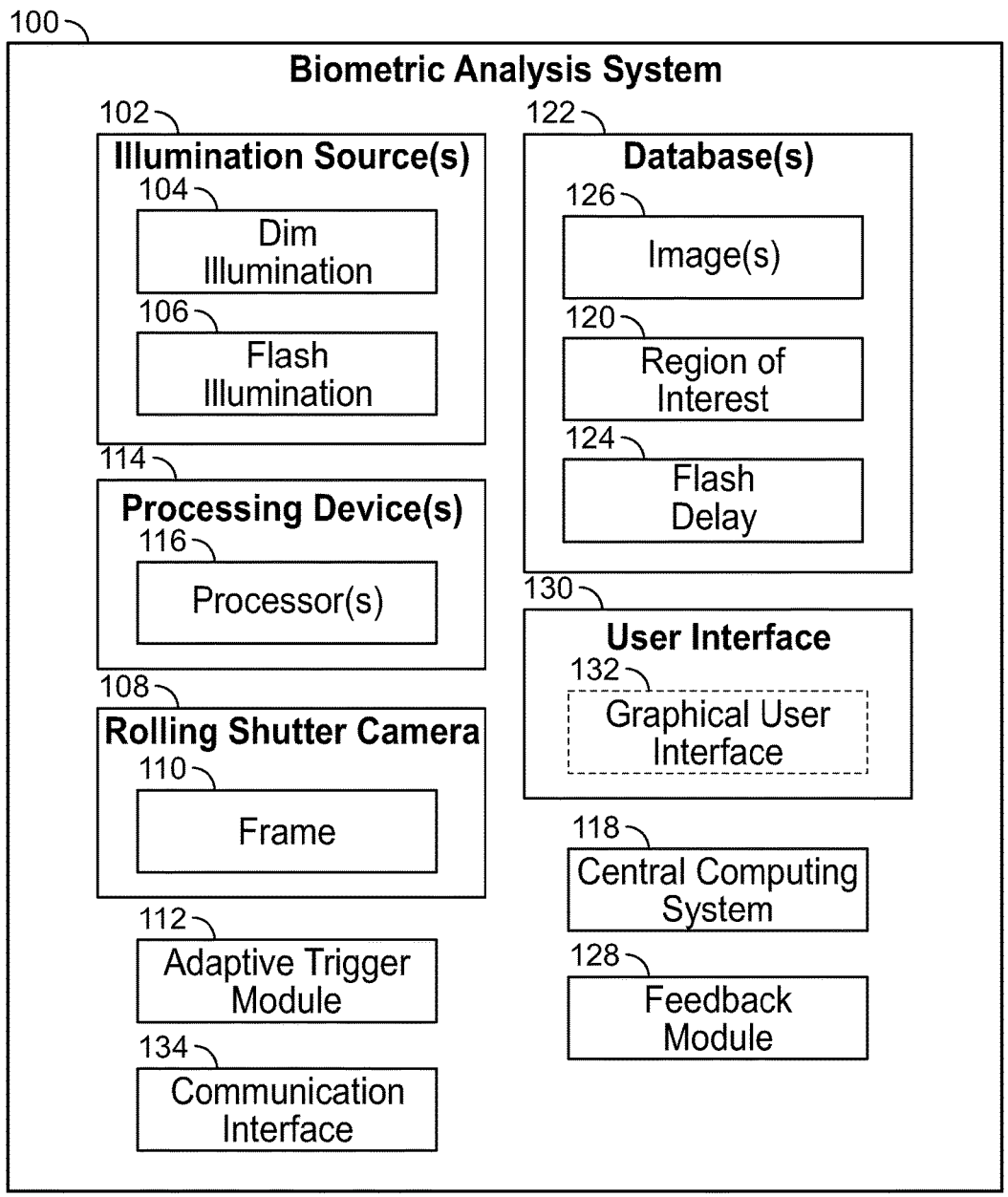
FIG. 8 is a schematic block diagram of an exemplary biometric analysis system in accordance with the present disclosure.

With reference to FIG. 8, a schematic block diagram of an exemplary biometric analysis system 100 (hereinafter "system 100") is provided. The system 100 is configured to detect and identify a region of interest of an object, such as the eyes of a person, and generates a time delay of the flash illumination such that the flash coincides with the region of interest. A rolling shutter camera can therefore be used for capturing one or more images for biometric analysis with the delayed flash illumination ensuring that the region of interest will be properly illuminated in the captured images. The system 100 is configured to track the region of interest within the frame or field-of-view of the rolling shutter camera, and adjusts the time delay of the flash pulse appropriately based on movement of the region of interest in and out of the frame.

The system 100 generally includes one or more illumination sources 102. The illumination sources 102 are configured to initially provide dim illumination 104 to a scene including an object to detect and identify the object (or the region of interest of the object). In some embodiments, the dim illumination 104 can be separate from the system 100 and can be provided by, e.g., ambient light, any other illumination source, sunlight, combinations thereof, or the like. The illumination sources 102 are further configured to provide flash illumination 106 (e.g., a pulse of flash illumination) to illuminate the region of interest during exposure of the rows corresponding to the region of interest, thereby ensuring that the region of interest will be illuminated in the captured image. In some embodiments, a single illumination source 102 can provide both the dim illumination 104 and the flash illumination 106. In some embodiments, separate illumination sources 102 can provide the dim illumination 104 and the flash illumination 106. In one embodiment, the illumination sources 102 can be NIR illumination sources. It should be understood that the dim illumination 104 is less bright than the flash illumination 106, and provides sufficient ambient light for the system 100 to detect objects in a scene as viewed by the rolling shutter camera.

The system 100 includes a rolling shutter camera 108 including a frame 110 with a field-of-view. The rolling shutter camera 108 is configured to capture one or more images (e.g., still frame images, video images, combinations thereof, or the like). The rolling shutter camera 108 is configured to initially capture an image of the scene and the object in the scene under dim illumination 104 conditions. The system 100 includes an adaptive trigger module 112 configured to be executed by a processing device 114 having a processor 116 (e.g., a controller). Although illustrated as separate components from the rolling shutter camera 108, it should be understood that in some embodiments, the rolling shutter camera 108 can include the illumination sources 102, the adaptive trigger module 112, the processing device 114, or the like. In some embodiments, the processing device 114 can be part of a central computing system 118. When executed, the adaptive trigger module 112 can analyze the captured image of the scene illuminated by the dim illumination 104 and detects the region of interest 120 within the scene. For example, the adaptive trigger module 112 can detect and identify the region of interest 120 as one of more eyes of the user, and stores the rows of the frame 110 corresponding to the region of interest 120 in a database 122 (e.g., a local or remote database).

Figure 9:
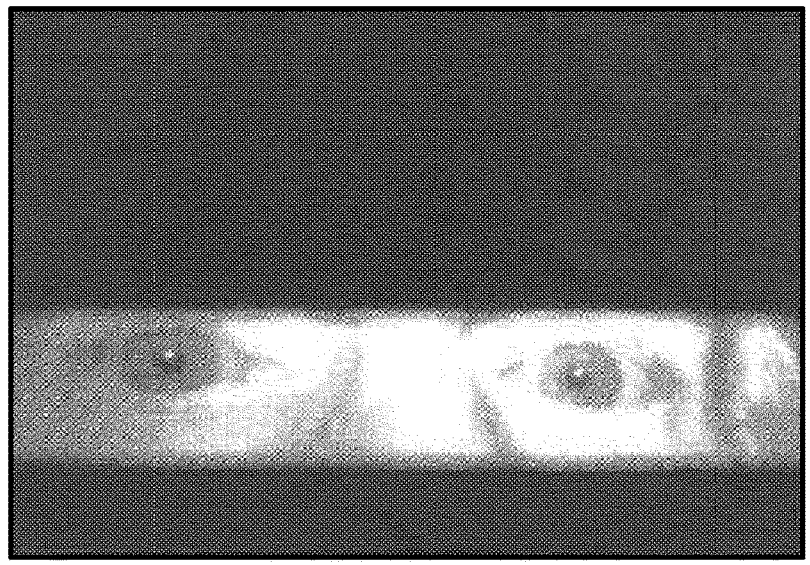
FIG. 9 is a representation of an image captured by a rolling shutter camera of the exemplary biometric analysis system including a stripe of flash illumination across a region of interest.

Based on the rows of the frame 110 corresponding to the region of interest 120, the adaptive trigger module 112 arranges a flash pulse delay 124 between the start of image writing by the rolling shutter camera 108 and a trigger of the flash illumination 106 such that the flash illumination 108 coincides with the identified region of interest 120. For example, if the eyes of the user are the region of interest 120 corresponding with rows 400-600 of the frame 110, the adaptive trigger module 112 arranges the flash pulse delay 124 such that the flash illumination 106 is triggered to illuminate the object during rows 400-600. Thus, rather than triggering the flash illumination 106 at the same time as the start of image writing by the rolling shutter camera 108, the image writing can start before triggering of the flash illumination 106 and the flash illumination 106 is only triggered to illuminate the region of interest 120. Such flash delay 124 ensures that the region of interest 120 is illuminated in the images 126 captured by the rolling shutter camera 108. The resulting image 126 generally includes a stripe of flash illumination 106 extending across the image 126 and over the eyes of the user (see, e.g., FIG. 9). Depending on the length of the exposure time, the height of the stripe of flash illumination 106 can be greater or smaller relative to the top and bottom of the image 126.

In some embodiments, the adaptive trigger module 112 can include a face finder algorithm that locates the face and/or features of the face in the scene. The face finder algorithm can therefore locate the face identifies one or more eyes of the face as the region of interest 120. Although discussed herein as eyes of a user, it should be understood that the region of interest 120 can be a unique identifier associated with a physical item that can be detected by an identifier finder algorithm of the adaptive trigger module 112. For example, the identifier finder algorithm of the adaptive trigger module 112 can be used to detect, e.g., a barcode, a QR code, or the like, on a physical item, identifies such unique identifier as the region of interest 120, and adjusts the flash delay 124 to ensure that the unique identifier is illuminated during capture of the image 126.

The adaptive trigger module 112 can be configured to track movement of the object within the field-of-view or frame 110 of the rolling shutter camera 108. In some embodiments, the adaptive trigger module 112 can be configured to continuously scan the scene in the frame 110 to detect the position of the region of interest 120. If the user moves such that the region of interest 120 in the frame 110 is not centered or changes relative to the previously detected rows for the region of interest 120, the adaptive trigger module 112 can determine the new rows corresponding to the region of interest 120, stores the new rows in the database 122, and adjusts the flash delay 124 to coincide with the new rows for the region of interest 120. Thus, an object moving in the frame 110 of the rolling shutter camera 108 can be tracked by the adaptive trigger module 112 to allow for the region of interest 120 of a moving object to be properly illuminated by the flash illumination 106.

The system 100 includes a feedback module 128 configured to be executed by the processing device 114 and/or the central computing system 118. In some embodiments, the rolling shutter camera 108 can include the feedback module 128. When executed, the feedback module 128 receives as input the images 126 captured by the rolling shutter camera 108 and analyzes the region of interest 120 captured in the image 126 to determine if the region of interest 120 is illuminated by the stripe of flash illumination 106. If the region of interest 120 is illuminated by the stripe of flash illumination 106, the feedback module 128 electronically outputs such findings to the adaptive trigger module 112 and no changes are made in the flash delay 124. If the region of interest 120 is not illuminated (or only partially illuminated) by the stripe of flash illumination 106, the feedback module 128 electronically outputs such findings to the adaptive trigger module 112. Based on the feedback from the feedback module 128, the adaptive trigger module 112 analyzes the frame 110 to locate the region of interest 120, determines the new rows associated with the region of interest 120, and adjusts the flash pulse delay 124 to trigger the flash illumination 106 at the appropriate rows coinciding with the region of interest 120. The feedback loop can be continuously performed to ensure the region of interest 120 is always illuminated by the stripe of flash illumination 106.

The system 100 can include a user interface 130 with a graphical user interface (GUI) 132 for receiving input from a user and for outputting information to the user. For example, the user interface 130 can be used to initiate the process performed by the system 100. As a further example, the user interface 130 can output an audio and/or visual alarm to the user when the region of interest 120 is no longer centered in the frame 110. The system 100 can include a communication interface 134 configured to provide a means for electronic transmission between components of the system 100, e.g., the illumination sources 102, the processing device 114, the rolling shutter camera 108, the adaptive trigger module 112, the database 122, the user interface 130, the central computing system 118, and feedback module 128, or the like.

Figure 10:
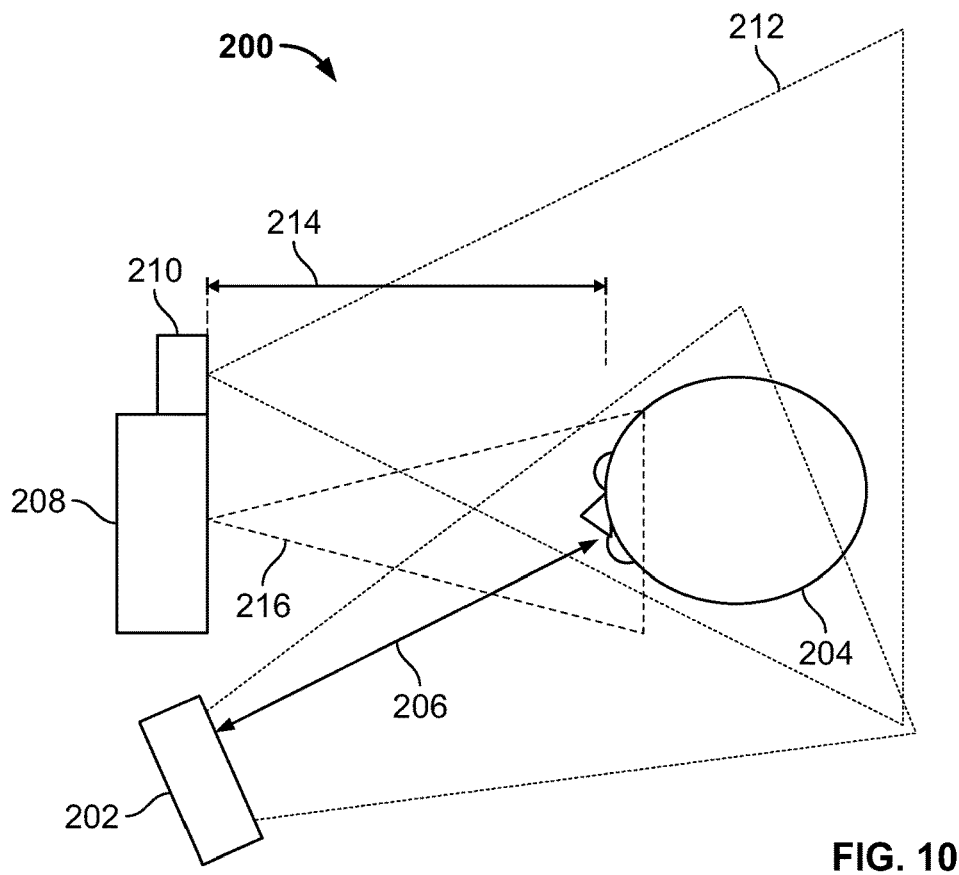
FIG. 10 is a diagrammatic view of an exemplary biometric analysis system in accordance with the present disclosure.

FIG. 10 is a diagrammatic view of an exemplary biometric analysis system 200 (hereinafter "system 200") of the present disclosure. The system 200 includes an illumination source 202 that provides dim illumination to the subject 204 in the scene. In some embodiments, the illumination source 202 can provide 1 ms NIR pulses to the scene. In some embodiments, the illumination source 202 can be an NIR light source not connected to the camera 208. The illumination source 202 can be positioned a distance 206 from the subject 204. In some embodiments, the illumination source 202 can also be configured to provide the flash illumination to the subject 204.

The system 200 includes a camera 208 including a rolling shutter (e.g., a rolling shutter camera, such as a smartphone camera, or the like) configured to capture one or more images of the subject. The camera 208 can have a field-of-view represented by area 216, including the region of interest of the subject 204. In some embodiments, the camera 208 includes an illumination source 210 (e.g., an integrated NIR light source) configured to provide flash illumination to a region of interest (e.g., the eyes of the subject 204). As an example, area 212 indicates the coverage of the NIR flash illumination provided by the illumination source 210, with the region of interest on the subject 204 being within the area 212. The camera 208 can be spaced by a distance 214 from the subject 204. In FIG. 10, the illumination source 202 appears separate from camera 202, however, one skilled in the art shall appreciate that, in some embodiments, the illumination source 202 can be incorporated into the camera 208 assembly such that the camera 208 assembly is capable of providing both the dim illumination and flash illumination to the subject 204.

Figure 11:
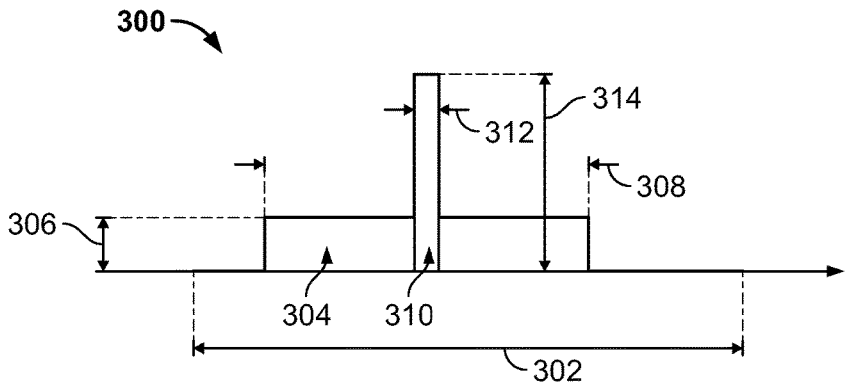
FIG. 11 is a diagrammatic view of a frame action of a rolling shutter camera of an exemplary biometric analysis system in accordance with the present disclosure.

FIG. 11 is a diagrammatic view of a frame action 300 of a rolling shutter camera of the exemplary biometric analysis systems disclosed herein. The frame action 300 includes a total frame time 302. Ambient light 304 having a low illumination level 306 can be provided for all or part of the total frame time 302 by a dim illumination source and/or sunlight. The total camera exposure time 308 indicates when the rolling shutter camera begins and ends image writing and read-out.

Based on the determination of the region of interest and the corresponding rows of the frame, a pulse of flash illumination 310 (e.g., NIR from a light-emitting diode (LED) illumination source) is triggered to coincide with the rows of the region of interest. The pulse of flash illumination 310 has a time or pulse width 312 that is significantly smaller than the camera exposure time 308, and an illumination level 314 that is brighter or higher than the level 306 of the ambient light 304. The region of interest is thereby illuminated by the flash illumination 310 while the remaining rows of the captured image are only illuminated by the ambient light 304.

In some embodiments, a 1280×960 sensor can be used with the rolling shutter camera. In some embodiments, a 120 fps VGA (640×480) sensor can be used with the rolling shutter camera to allow for full frame exposure in 4 ms, and can be synchronized with an approximately 4 ms LED flash every 8$^{th}$ frame. The VGA output can provide (unscaled) 15 fps feedback to the user facing the monitor of the system. The 4 ms can provide sufficient flash pulse while allowing for cost effective use of an LED and rolling shutter accommodation, and allowing for eye safety.

In some embodiments, a bright light (e.g., approximately 850 nm LED, two LEDs) can be used for the flash pulse. The systems can therefore have high pulsed current capabilities. The rolling shutter camera can have a high quality camera lens and NIR filtering. In some embodiments, the NIR filter can be tighter than 100 nm around the LED center wavelength. In some embodiments, the system can include optics with a modulation transfer function (MTF) optimized for the spatial frequencies that enter the system. In some embodiments, the system can include preprocessing of iris images for a particular spectrum of spatial frequencies (e.g., low, medium, high, or the like).

Figure 12:
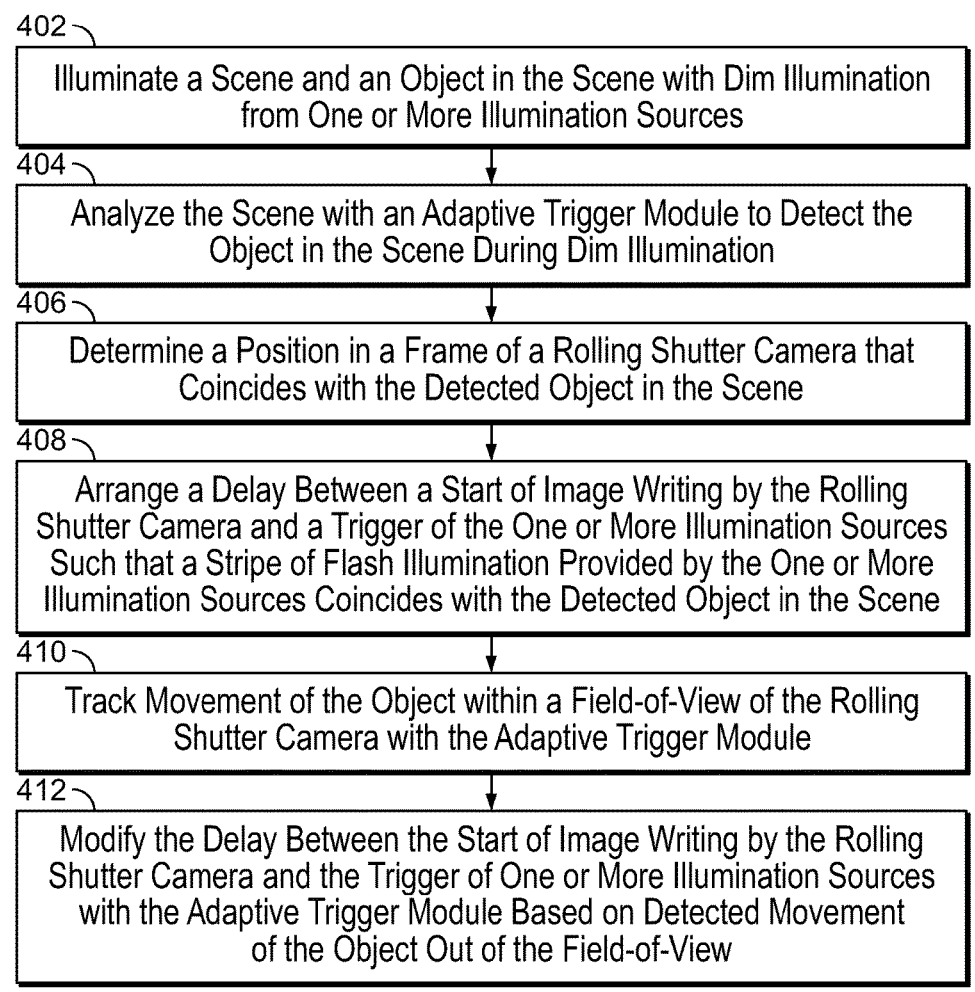
FIG. 12 is a flowchart illustrating an exemplary process of implementing an exemplary biometric analysis system in accordance with the present disclosure.

FIG. 12 is a flowchart illustrating an exemplary process 400 of implementing the biometric analysis systems disclosed herein. To begin, at step 402, a scene and an object in the scene are illuminated with dim illumination from one or more illumination sources. At step 404, the scene is analyzed with an adaptive trigger module to detect the object (or a region of interest associated with the object) in the scene during dim illumination. At step 406, a position in a frame of a rolling shutter camera is determined with the adaptive trigger module, the position coinciding with the detected object (or region of interest associated with the object) in the scene.

At step 408, a delay is arranged by the adaptive trigger module between a start of image writing by the rolling shutter camera and a trigger of the illumination sources such that a stripe of flash illumination provided by the illumination sources coincides with the detected object (or region of interest associated with the object) in the scene. At step 410, movement of the object is tracked within a field-of-view of the rolling shutter camera with the adaptive trigger module. At step 412, the delay between the start of image writing by the rolling shutter camera and the trigger of the illumination sources is modified with the adaptive trigger module based on detected movement of the object (or region of interest associated with the object) out of the field-of-view.

Figure 13:
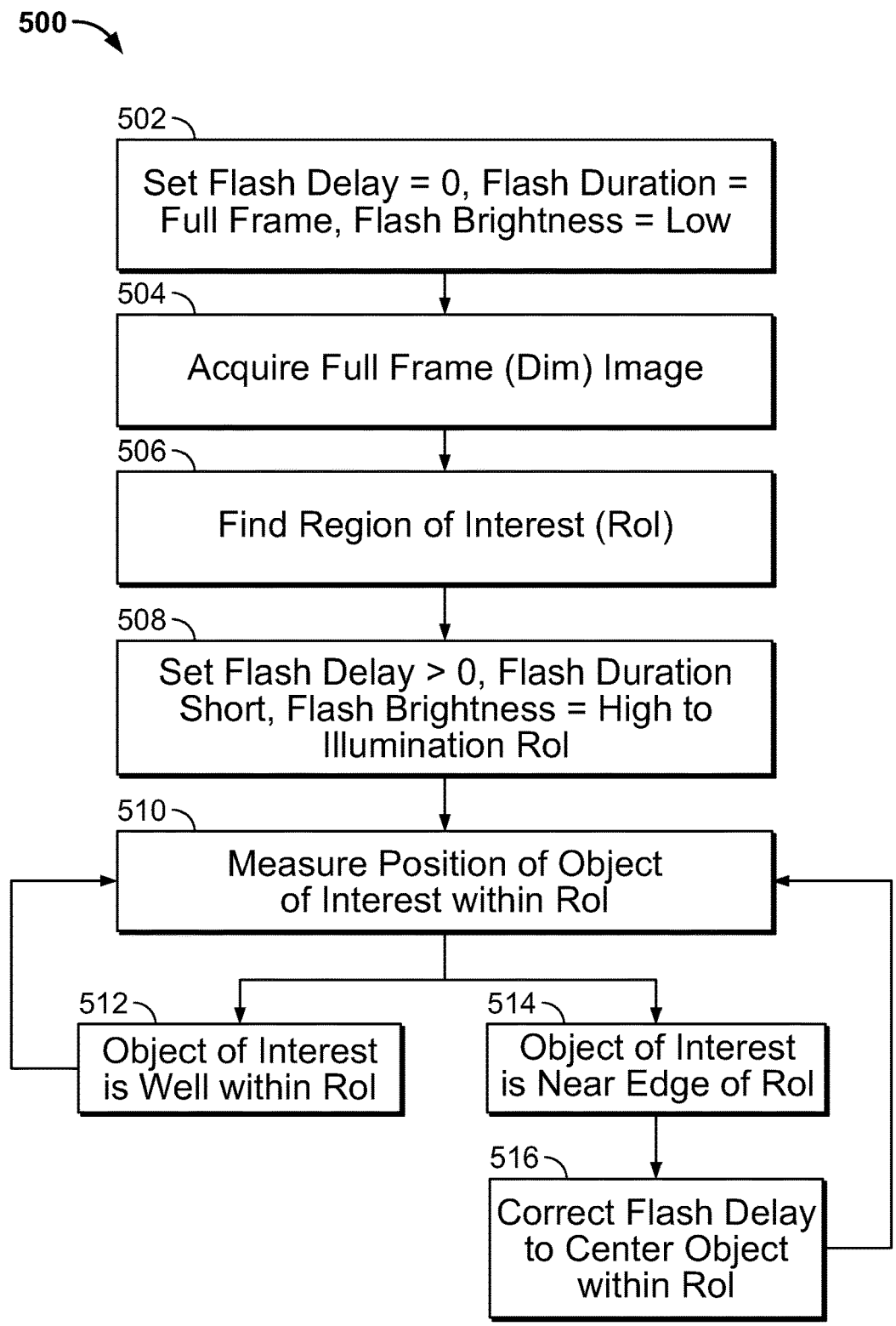
FIG. 13 is a flowchart illustrating an exemplary process of implementing an exemplary biometric analysis system in accordance with the present disclosure.

FIG. 13 is a flowchart illustrating an exemplary process 500 of implementing the biometric analysis systems disclosed herein. To begin, at step 502, the adaptive trigger module can set the flash delay at 0 ms, the flash duration equal to the time of the full frame, and the flash brightness to low. At step 504, a full frame image can be acquired with the rolling shutter camera under dim illumination. At step 506, the adaptive trigger module analyzes the image captured at step 504 and locates the region of interest in the image.

At step 508, the adaptive trigger module sets the flash delay to a value greater than 0 ms, the flash duration to short (e.g., a pulse), and the flash brightness to high (e.g., higher than the dim illumination) to illuminate the region of interest. At step 510, the adaptive trigger module measures the position of the object of interest within the region of interest (e.g., eyes of the user located on the user's face). At step 512, if the object of interest is within the region of interest, the process 500 continues a loop to constantly (or at predetermined frequencies of time) ensure that the object is maintained within the region of interest. At step 514, if the object of interest is near an edge of the frame or region of interest, the process 500 performs step 516 to correct the flash delay such that the object is centered within the region of interest. The region of interest can thereby be maintained in the flash illumination stripe despite relative motion of the object and/or the camera. In some embodiments, the process can include a loop that analyzes the captures images to control the intensity of the flash illumination, thereby avoiding saturation of the object.

Figure 14:
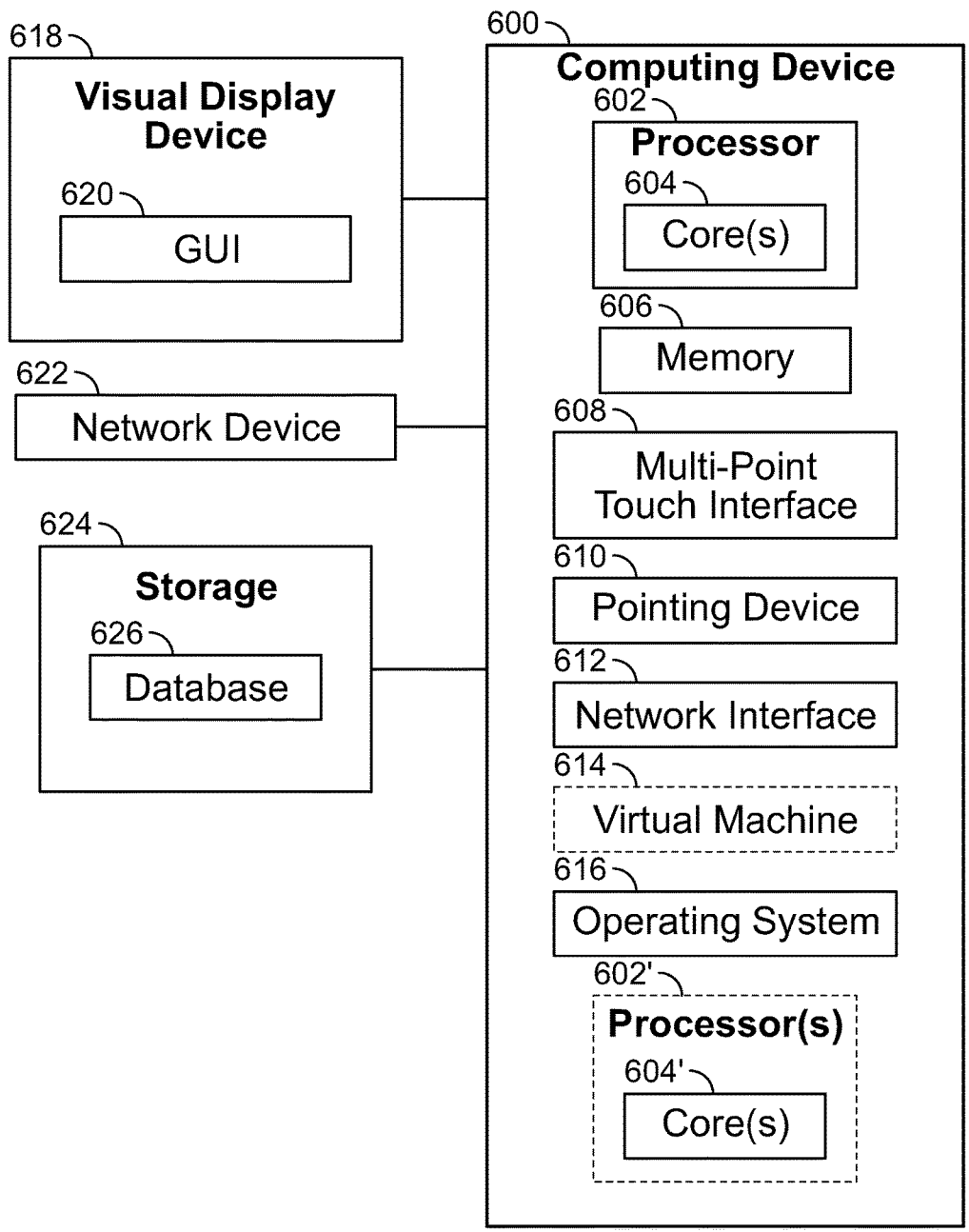
FIG. 14 is a block diagram of an exemplary computing device for implementing an exemplary biometric analysis system in accordance with the present disclosure.

FIG. 14 is a block diagram of a computing device 600 in accordance with exemplary embodiments of the present disclosure. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device 600 may store computer-readable and computer-executable instructions or software for implementing exemplary embodiments of the present disclosure (e.g., instructions for operating the illumination sources, instructions for operating the processing device, instructions for operating the rolling shutter camera, instructions for operating the adaptive trigger module, instructions for operating the communication interface, instructions for operating the user interface, instructions for operating the central computing system, instructions for operating the feedback module, combinations thereof, or the like). The computing device 600 also includes configurable and/or programmable processor 602 and associated core 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' may each be a single core processor or multiple core (604 and 604') processor.

Virtualization may be employed in the computing device 600 so that infrastructure and resources in the computing device 600 may be shared dynamically. A virtual machine 614 may be provided to handle a process running on multiple processors so that the process appears to be using only one computing resource rather than multiple computing resources. Multiple virtual machines may also be used with one processor. Memory 606 may include a computer system memory or random access memory, such as DRAM, SRAM, EDO RAM, and the like. Memory 606 may include other types of memory as well, or combinations thereof.

A user may interact with the computing device 600 through a visual display device 618 (e.g., a personal computer, a mobile smart device, or the like), such as a computer monitor, which may display one or more user interfaces 620 (e.g., a graphical user interface) that may be provided in accordance with exemplary embodiments. The computing device 600 may include other I/O devices for receiving input from a user, for example, a camera, a sensor, a keyboard or any suitable multi-point touch interface 608, a pointing device 610 (e.g., a mouse). The keyboard 608 and the pointing device 610 may be coupled to the visual display device 618. The computing device 600 may include other suitable conventional I/O peripherals.

The computing device 600 may also include one or more storage devices 624, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the biometric analysis systems described herein. Exemplary storage device 624 may also store one or more databases 626 for storing any suitable information required to implement exemplary embodiments. For example, exemplary storage device 624 can store one or more databases 626 for storing information, such as data relating to captured images 126 under dim illumination 104 and flash illumination 106, regions of interest 120, flash delay 124, combinations thereof, or the like, and computer-readable instructions and/or software that implement exemplary embodiments described herein. The databases 626 may be updated by manually or automatically at any suitable time to add, delete, and/or update one or more items in the databases.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 may include a built-in network adapter, network interface card, PCMCIA network card, PCI/PCIe network adapter, SD adapter, Bluetooth adapter, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 600 may run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

Figure 15:
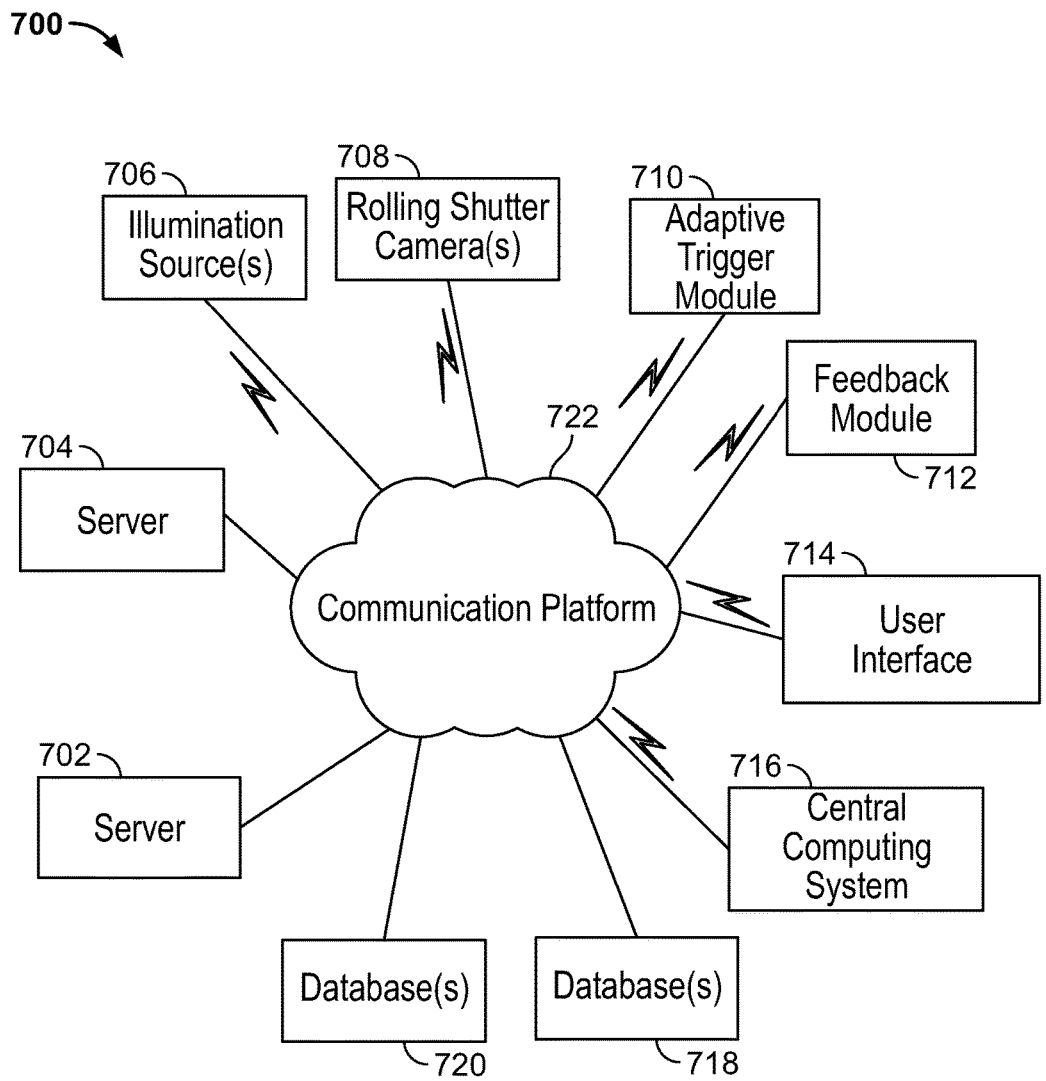
FIG. 15 is a block diagram of an exemplary biometric analysis system environment in accordance with the present disclosure.

FIG. 15 is a block diagram of an exemplary biometric analysis system environment 700 in accordance with exemplary embodiments of the present disclosure. The environment 700 can include servers 702, 704 configured to be in communication with one or more illumination sources 706, one or more rolling shutter cameras 708, one or more adaptive trigger modules 710, a feedback module 712, a user interface 714, and a central computing system 716 via a communication platform 922, which can be any network over which information can be transmitted between devices communicatively coupled to the network. For example, the communication platform 722 can be the Internet, Intranet, virtual private network (VPN), wide area network (WAN), local area network (LAN), and the like. In some embodiments, the communication platform 722 can be part of a cloud environment.

The environment 700 can include repositories or databases 718, 720, which can be in communication with the servers 702, 904, as well as the one or more illumination sources 706, one or more rolling shutter cameras 708, one or more adaptive trigger modules 710, the feedback module 712, the user interface 714, and the central computing system 716, via the communications platform 722.

In exemplary embodiments, the servers 702, 704, one or more illumination sources 706, one or more rolling shutter cameras 708, one or more adaptive trigger modules 710, the feedback module 712, the user interface 714, and the central computing system 716 can be implemented as computing devices (e.g., computing device 600). Those skilled in the art will recognize that the databases 718, 720 can be incorporated into one or more of the servers 702, 704. In some embodiments, the database 718 can store data relating to captured images, regions of interest 120, flash delay 124, combinations thereof, or the like, can be distributed over multiple databases 718, 720.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A biometric analysis system, comprising:
one or more illumination sources configured to provide dim illumination to a scene including an object and configured to provide flash illumination to the object in the scene;
a rolling shutter camera configured to capture one or more images; and
an adaptive trigger module configured to (i) analyze the scene to detect the object in the scene during dim illumination of the scene, (ii) determine a position in a frame of the rolling shutter camera that coincides with the detected object in the scene, and (iii) arrange a delay between a start of image writing by the rolling shutter camera and a trigger of the one or more illumination sources such that a stripe of the flash illumination coincides with the detected object in the scene.

2. The biometric analysis system of claim 1, wherein the adaptive trigger module is configured to track movement of the object within a field-of-view of the rolling shutter camera.

3. The biometric analysis system of claim 2, wherein the adaptive trigger module is configured to modify the delay between the start of image writing by the rolling shutter camera and the trigger of the one or more illumination sources based on detected movement of the object within the field-of-view.

4. The biometric analysis system of claim 1, wherein the adaptive trigger module is configured to detect a region of interest of the object and arranges the delay such that the stripe of flash illumination coincides with the detected region of interest of the object.

5. The biometric analysis system of claim 4, wherein the region of interest of the object includes eyes of a person.

6. The biometric analysis system of claim 1, wherein the object is a person, and wherein the adaptive trigger module comprises a face finder configured to detect a face of the person.

7. The biometric analysis system of claim 1, wherein the object is a physical item, and the adaptive trigger module comprises an identifier finder configured to detect a unique identifier associated with the physical item.

8. The biometric analysis system of claim 7, wherein the unique identifier is a barcode or a quick response (QR) code.

9. The biometric analysis system of claim 1, wherein the one or more illumination sources are configured to provide the flash illumination as a synchronized pulse of flash illumination.

10. The biometric analysis system of claim 1, wherein the flash illumination provided by the one or more illumination sources is brighter than the dim illumination provided by the one or more illumination sources.

11. The biometric analysis system of claim 1, wherein the one or more illumination sources comprise a first illumination source configured to provide the dim illumination and a second illumination source configured to provide the flash illumination.

12. The biometric analysis system of claim 1, wherein the one or more illumination sources are near infrared illumination sources.

13. The biometric analysis system of claim 1, wherein the one or more illumination sources are ambient light.

14. The biometric analysis system of claim 1, wherein the adaptive trigger module is configured to sweep an illuminated stripe down the frame as the rolling shutter camera captures the one or more images, analyzes an illuminated section of the one or more images to identify a region of interest in the illuminated section, and stops sweeping of the illuminated stripe when the region of interest is identified.

15. The biometric analysis system of claim 1 provided as a smartphone having said one or more illumination sources, said rolling shutter camera, and said adaptive trigger module.

16. A biometric analysis system, comprising:
one or more illumination sources configured to provide dim illumination to a scene including a subject and configured to provide flash illumination to the subject in the scene;
a rolling shutter camera configured to capture one or more images; and
an adaptive trigger module configured to (i) analyze the scene to detect eyes of the subject in the scene during dim illumination of the scene, (ii) identify the eyes of the subject as a region of interest, (iii) determine a position in a frame of the rolling shutter camera that coincides with the identified region of interest, and (iv) arrange a flash pulse delay between a start of image writing by the rolling shutter camera and a trigger of the one or more illumination sources such that a stripe of the flash illumination coincides with the identified region of interest.

17. The biometric analysis system of claim 16, wherein the flash pulse delay ensures that the illuminated region of interest is maintained in a center of the frame of the rolling shutter camera.

18. The biometric analysis system of claim 16, comprising a feedback module configured to analyze a captured image of the region of interest and determine if the region of interest is illuminated by the stripe of the flash illumination.

19. The biometric analysis system of claim 18, wherein the adaptive trigger module is configured to adjust the flash pulse delay based on the determination of the feedback module to ensure that the region of interest is illuminated by the stripe of the flash illumination.

20. The biometric analysis system of claim 16 provided as a smartphone having said one or more illumination sources, said rolling shutter camera, and said adaptive trigger module.

21. A method of biometric analysis, comprising:
illuminating a scene and an object in the scene with dim illumination from one or more illumination sources;
analyzing the scene with an adaptive trigger module to detect the object in the scene during dim illumination;
determining a position in a frame of a rolling shutter camera that coincides with the detected object in the scene; and
arranging a delay between a start of image writing by the rolling shutter camera and a trigger of the one or more illumination sources such that a stripe of flash illumination provided by the one or more illumination sources coincides with the detected object in the scene.

22. The method of claim 21, comprising tracking movement of the object within a field-of-view of the rolling shutter camera with the adaptive trigger module.

23. The method of claim 22, comprising modifying the delay between the start of image writing by the rolling shutter camera and the trigger of the one or more illumination sources with the adaptive trigger module based on detected movement of the object within the field-of-view.

24. A non-transitory computer-readable medium storing instructions for biometric analysis that are executable by a processing device, wherein execution of the instructions by the processing device causes the processing device to:
illuminate a scene and an object in the scene with dim illumination from one or more illumination sources;
analyze the scene with an adaptive trigger module to detect the object in scene during dim illumination;
determine a position in a frame of a rolling shutter camera that coincides with the detected object in the scene; and
arrange a delay between a start of image writing by the rolling shutter camera and a trigger of the one or more illumination sources such that a stripe of flash illumination provided by the one or more illumination sources coincides with the detected object in the scene.

* * * * *